United States Patent [19]

McEowen et al.

[11] 3,748,649

[45] July 24, 1973

[54] TRANSLATOR MEMORY DECODING ARRANGEMENT FOR A MICROPROGRAM CONTROLLED PROCESSOR

[75] Inventors: James Royce McEowen, Holmdel; David Clement Opferman, Red Bank; Robert McKee Smith, Holmdel, all of N.J.

[73] Assignee: Bell Telephone Laboratories, Incorporated, Murray Hill, N.J.

[22] Filed: Feb. 29, 1972

[21] Appl. No.: 230,292

[52] U.S. Cl. .............................................. 340/172.5
[51] Int. Cl. .............................................. G06f 9/12
[58] Field of Search .................................. 340/172.5

[56] References Cited

UNITED STATES PATENTS

| | | | |
|---|---|---|---|
| 3,675,214 | 7/1972 | Ellis et al. | 340/172.5 |
| 3,636,522 | 1/1972 | Buschmann et al. | 340/172.5 |
| 3,646,522 | 2/1972 | Furman et al. | 340/172.5 |
| 3,560,933 | 2/1971 | Schwartz | 340/172.5 |
| 3,599,176 | 8/1971 | Cordero, Jr. et al. | 340/172.5 |

*Primary Examiner*—Paul J. Henon
*Assistant Examiner*—Melvin B. Chapnick
*Attorney*—W. L. Keefauver

[57] ABSTRACT

A microinstruction controlled minicomputer is arranged to perform processing functions either autonomously or in conjunction with a high level external memory. A dual bus scheme is utilized throughout the computer and all elements, such as memories and registers, have access to both buses for information transferal purposes. The controlling microinstructions are obtained from a first or program memory in sequential fashion and the OP code of each microinstruction specifies a particular word in a second or translation memory for decoding purposes. Each word of the second memory contains the number of bits necessary to control directly all of the functions of the machine. A multiphase clock is used to control the sequence of operation of the machine functions in conjunction with the various bits of the selected word of the translator memory. The processor is arranged to accept information from an external memory under control of a particular microinstruction and is arranged to jump to a new program memory microinstruction as directed, always remaining controlled by instructions decoded from the microinstruction supplied by the internal program memory.

21 Claims, 33 Drawing Figures

Patented July 24, 1973 3,748,649

Patented July 24, 1973 | 3,748,649

27 Sheets-Sheet 18

FIG. 33

| ADDRESS | OP CODE 16 14 12 | DESTINATION CONTROL 10 9 8 7 6 5 4 3 2 1 | INSTRUCTION FORMAT |
|---|---|---|---|
| 1 | 0 1 1 1 1 0 | 0 0 1 1 1 0 0 0 1 0 | FLG L15 TO ACC |
| 2 | 1 1 0 0 1 0 | 0 0 0 0 0 0 0 0 0 1 | JMP TO 1 IF A0=0 |
| 3 | 0 0 0 0 0 0 | 0 0 1 1 1 0 0 0 0 1 | SRC→ACC |
| 4 | 1 0 1 1 0 1 | 0 0 0 0 0 0 0 0 0 0 | ACC→SM[0] |
| 5 | 0 1 1 1 1 0 | 0 1 1 1 1 0 0 0 1 0 | FLG L15 TO ACC |
| 6 | 1 1 0 0 1 0 | 0 0 0 0 0 0 0 1 0 1 | JMP TO 5 IF A0=0 |
| 7 | 0 0 0 0 0 0 | 0 0 1 1 1 0 0 0 0 1 | SRC→ACC |
| 8 | 1 0 1 1 0 1 | 0 0 0 0 0 0 0 0 0 1 | ACC→SM[1] |
| 9 | 0 0 0 0 0 0 | 0 0 0 0 0 1 0 0 0 0 | ZERO→DST |
| 10 | 1 0 1 1 1 0 | 0 0 0 1 0 1 0 0 0 0 | JMP TO 80 |
| 30 | 0 0 1 1 1 0 | 0 0 0 0 0 0 0 0 0 0 | SM[0]→ACC |
| 31 | 0 1 1 0 1 0 | 0 0 0 0 0 0 0 0 0 1 | SM[1]+ACC→ACC |
| 32 | 0 0 0 0 0 0 | 0 0 0 0 0 1 1 1 1 0 | ACC→DST |
| 33 | 1 0 1 1 1 0 | 0 0 0 0 0 0 0 0 0 1 | JMP TO 1 |
| 40 | 0 0 1 1 1 0 | 0 0 0 0 0 0 0 0 0 0 | SM[0]→ACC |
| 41 | 0 1 1 0 1 1 | 0 0 0 0 0 0 0 0 0 1 | SM[1]-ACC→ACC |
| 42 | 0 0 0 0 0 0 | 0 0 0 0 0 1 1 1 1 0 | ACC→DST |
| 43 | 1 0 1 1 1 0 | 0 0 0 0 0 0 0 0 0 1 | JMP TO 1 |
| 50 | 0 0 0 0 0 0 | 0 0 1 1 1 0 0 0 0 0 | ZERO TO ACC |
| 51 | 1 0 1 1 0 1 | 0 0 0 0 0 0 0 0 1 1 | ACC→SM[3] |
| 52 | 0 0 1 1 1 0 | 0 0 0 0 0 0 0 0 0 0 | SM[0]→ACC |
| 53 | 1 0 1 1 1 1 | 0 0 0 0 1 1 1 0 0 0 | JMP TO 66 IF ACC=0 |
| 54 | 0 1 0 0 0 0 | 0 0 0 0 0 0 0 0 0 0 | SM[0]-1→ACC |
| 55 | 1 0 1 1 0 1 | 0 0 0 0 0 0 0 0 0 0 | ACC→SM[0] |
| 56 | 0 0 1 1 1 0 | 0 0 0 0 0 0 0 0 0 1 | SM[1]→ACC |
| 57 | 0 1 1 0 1 0 | 0 0 0 0 0 0 0 0 0 1 | SM[1]+ACC→ACC |
| 58 | 1 0 1 1 0 1 | 0 0 0 0 0 0 0 0 1 1 | ACC→SM[3] |
| 59 | 0 1 0 0 0 0 | 0 0 0 0 0 0 0 0 0 0 | SM[0]-1→ACC |
| 60 | 1 0 1 1 0 1 | 0 0 0 0 0 0 0 0 0 0 | ACC→SM[0] |
| 61 | 1 0 1 1 1 1 | 0 0 0 0 1 1 1 0 0 0 | JMP TO 66 IF ACC=0 |
| 62 | 0 0 1 1 1 0 | 0 0 0 0 0 0 0 0 0 1 | SM[1]→ACC |
| 63 | 0 1 1 0 1 0 | 0 0 0 0 0 0 0 0 1 1 | SM[3]+ACC→ACC |
| 64 | 1 0 1 1 0 1 | 0 0 0 0 0 0 0 0 1 1 | ACC→SM[3] |
| 65 | 1 0 1 1 1 0 | 0 0 0 0 1 1 0 0 0 1 | JMP TO 59 |
| 66 | 0 0 1 1 1 0 | 0 0 0 0 0 0 0 0 1 1 | SM[3]→ACC |
| 67 | 0 0 0 0 0 0 | 0 0 0 0 0 1 1 1 1 0 | ACC→DST |
| 68 | 1 0 1 1 1 0 | 0 0 0 0 0 0 0 0 0 1 | JMP TO 1 |
| 80 | 0 0 0 0 0 0 | 0 0 1 1 1 0 0 0 1 0 | FLG TO ACC |
| 81 | 1 1 0 0 1 0 | 0 0 0 1 0 1 0 0 0 0 | JMP TO 80 IF A0=0 |
| 82 | 0 0 0 0 0 0 | 0 0 1 1 1 0 1 0 1 0 | EMSR→ACC |
| 83 | 1 1 0 1 1 1 | 0 0 1 1 0 0 1 1 1 0 | ACC→PM (JMP TO 30,40,50,82) |
| 84 | 1 1 1 0 0 0 | 0 0 0 0 0 0 0 0 0 0 | HALT |

TRANSLATOR MEMORY DECODING ARRANGEMENT FOR A MICROPROGRAM CONTROLLED PROCESSOR

FIELD OF THE INVENTION

The use of a series of word instructions to control a computer or processor is now well known in the art and under certain conditions allows a flexibility and ease of programming not obtainable by other computer orientations. The term "microinstruction" is typically used to define each of the instruction words read from a memory for control purposes. Usually these microinstructions are arranged into a group to form a microinstruction program and each microinstruction is read from the memory in sequential fashion to perform the necessary control functions.

In a typical situation some of the bits of each microinstruction are used to specify the exact control function required while the remainder of the bits are utilized to direct the control function among the various elements of the computer. Our present invention is concerned primarily with the decoding of the control or operational code of each microinstruction in a manner which further enhances the flexibility of microprogrammed machines.

Another aspect of our invention is the utilization of an external or a high-level memory in conjunction with the microprogramming memory in a manner which allows the internal microinstruction program to maintain control of the system while accepting direction from the external memory.

BACKGROUND OF THE INVENTION

Recent advances in the art of electronic component manufacture have led to the realization that economies can be achieved when electronic elements, such as transistors, are deposited on films or other substrates in a regular repeating manner without regard to the logical interrelationships between those elements. Thus, the cost of providing memory capacity, which effectively is a matrix of regularly arranged electronic elements, is much more economical on a per bit basis than, say, a number of transistors or other elements arranged to perform a specific logical operation. Medium scale integration (MSI) and large scale integration (LSI) are manufacturing techniques which allow these economies to be achieved.

In a microinstruction computer operation, it is necessary to decode certain digits or bits of the instruction word for control purposes. A typical technique for decoding is to utilize the coded value of a control word to achieve signals on particular output leads. In order to generate these signals, the outputs from each of the bits are decoded by AND, NAND or other logic gates arranged in a fixed particular logical pattern. Numerous techniques are currently available to perform these decoding functions, each relying upon the various combinations of electronic logic circuitry to generate the output control signals.

Since each such decoding circuit is uniquely associated with the particular output to be decoded, the electronic elements utilized must be arranged, interconnected and wired in a particular manner. Thus, because of the lack of widespread utilization of any particular logic decoding arrangement, LSI and MSI techniques are not economically available to accomplish the decoding function. Accordingly, although manufacturing economies may be utilized to greatly reduce the cost of the computer memory, these economies in the past have not been utilized to the fullest possible extent in microprogrammed computers. Thus, a need exists in the art for a computer orientation utilizing regularly arranged electronic elements for both memory and data manipulation purposes.

In addition, in certain situations computers must be designed for use in environments where reliability and continued operation over long periods of time can be assured. One such situation is where a computer is utilized as a telephone processor for control of communication systems on customer premises where telephone craftsmen are not in attendance. In such an environment it is essential that a computer processor is designed in a manner to ensure reliability and to minimize down time.

Another characteristic of such a processor is that it must be capable of utilizing high order language to handle the complex problems inherent in processor operations. Consideration also must be given to the physical size of the computer while still allowing a high degree of sophistication in the machine.

SUMMARY OF THE INVENTION

These and other objects of our invention are obtained by arranging a processor with a source bus and a destination bus and registers accessible to both buses. Information can be transferred from the destination bus to any of the registers and from any register to the source bus. Information on the source bus can be gated to the destination bus via an arithmetic logic unit ALU and an accumulator ACC.

The buses are arranged to handle a particular number of data bits, for example 16 bits, and each register is arranged with the same capability. Thus, when information is gated from a register to the source bus the first data bit in the register is communicated to a first path of the bus and each other data bit from the register is communicated concurrently to a particular other path of the bus.

Three memories are utilized to control information transfer. One of the memories is a scratch pad or temporary memory and the other two memories can be permanent memories. One of the other two memories is a microprogram memory which in our disclosed embodiment is a read-write memory having various instruction sets, each such set or program containing a series of words arranged sequentially. Data flow between the registers and other equipment is directed by information decoded by a translation memory from each microprogram word supplied by the program memory. A clock circuit having a number of phases is utilized in conjunction with each program word for actual control of data transfer.

The program memory utilized is a 16-bit memory with 6 bits representing the operational (OP) code which must be decoded in order to control the machine functions. In our processor, decoding is accomplished by arranging the OP code obtained from the program memory to form an address location in a translator memory, which in our embodiment is a read-only memory. The translator memory is arranged with 64 words and 24 bits per word, each bit utilized in a direct manner to control the operation of the various devices of the computer.

For example, assume that a 6-bit OP code obtained from the program memory is an OP code calling for the transfer of information from a source register to the arithmetic logic unit ALU, the information to be ANDed with information in the accumulator ACC and the result stored in a particular designation register. In such a situation, the OP code as obtained from the program memory addresses a particular 24-bit word in the translator memory. During phase 1 of the clock certain bits of the 24-bit word obtained from the translator memory cause the information from the source register to be transferred to the source bus. Certain other bits of the translator memory word concurrently perform other operations among the various elements of the computer in preparation for the particular function to be carried out, i.e., setting the arithmetic logic unit ALU to the AND function. During subsequent phases of the clock, as will be detailed hereinafter, the desired information transfer and logic operations are performed under joint control of various bits of the word obtained from the translator memory and various bits of the currently operative program memory instruction.

The OP code obtained from the program memory contains 6 bits thereby providing, if packed as densely as possible, 64 different functions or addresses in the translator memory. Although each word of the translator memory contains 24 bits, the possible number of different output combinations remains 64 since only 64 words may be addressed by the OP code. Thus, the 24 bits of each word are not expanded to $2^{24}$ as would be the case if they also were densely packed, but rather each word in the translator memory is used in an unpacked manner to provide a single computer function directly. The fact that the words are used unpacked means that no logic gates are necessary and thus economies may be realized since such regularly arranged 24-bit, 64-word read-only memories are items which can be sold off the shelf to a wide range of customers. Therefore, LSI and MSI manufacturing techniques can be utilized in the construction of such a memory.

Although in our computer arrangement the bit capability of the translator memory is wasted (in terms of possible different outputs) the overall system cost is reduced without sacrificing reliability. In addition, another major advantage of our processor arrangement is the regularity of the entire system which follows from the fact that the entire structure is, in essence, a distributed memory where the buses themselves are memory elements. Thus, whenever it is desired to expand the bit capability of the processor a separate memory can be added in a building block manner.

This hierarchy of control memories may each be modifiable by the others. In other words, the microprogram memory may be modified or changed under high-level program control, or the reverse may occur.

Accordingly, it is a feature of our invention that the logical operations performed on the machine control field of a microinstruction to develop machine control signals are eliminated by a translator memory, the words of which are addressable by the machine control bits of the microinstruction and the individual bits of an addressed word are used without decoding in an unpacked manner.

It is a further feature of our invention that the program memory containing the microinstructions is read and writeable under control of an operative one of the microinstructions contained therein.

It is a further feature of our invention that under control of an operative microinstruction an auxiliary memory can be addressed to provide microinstructions for writing into the program memory at selected locations therein, the location being controlled either by the operative microinstruction or by a portion of the information supplied by the auxiliary memory.

DESCRIPTION OF THE DRAWING

The operation and utilization of the present invention will be more fully apparent from the following description of the drawing in which:

FIG. 33 is a chart showing microinstruction programs utilized for illustrative purposes.

Figure 1:
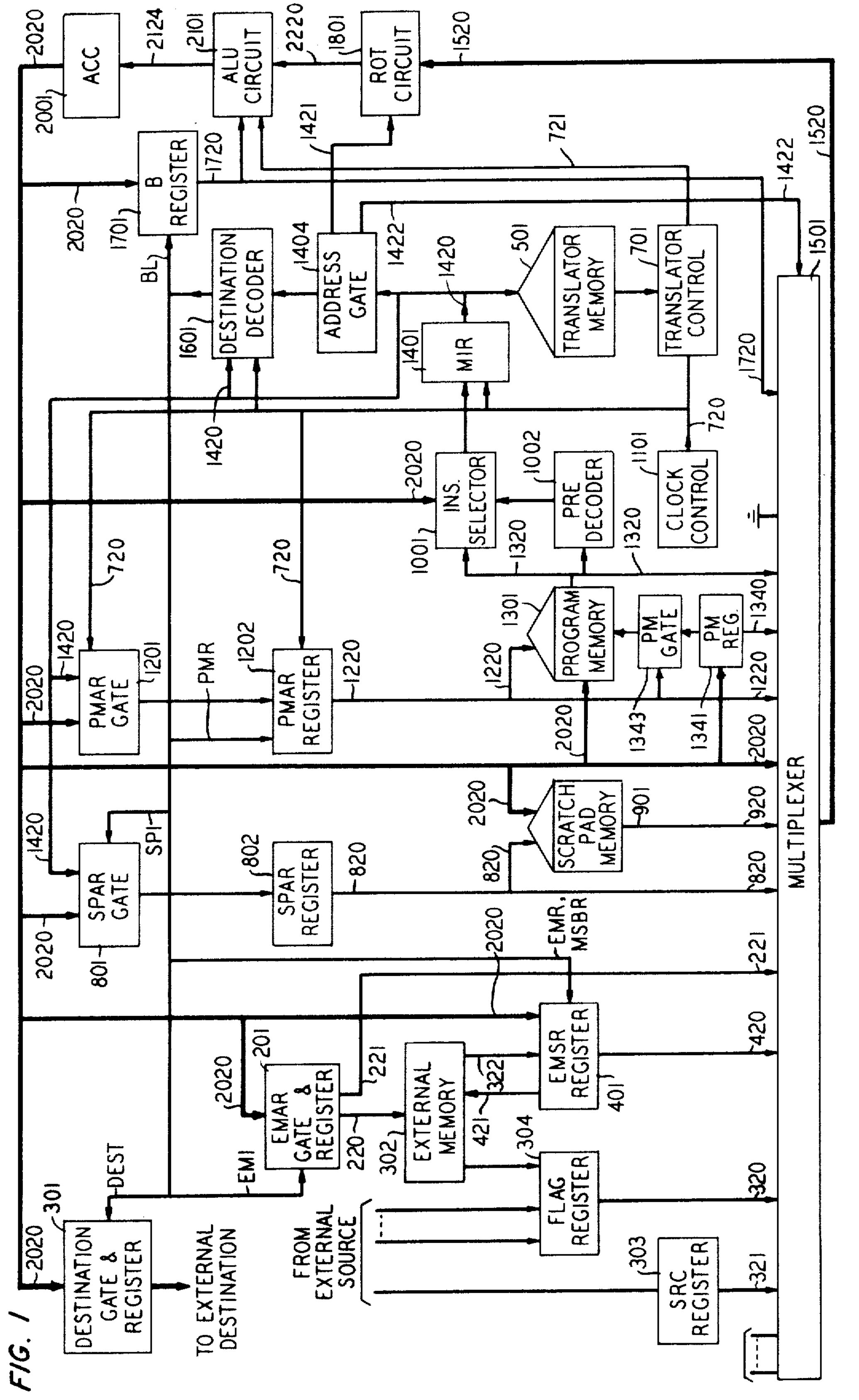
FIG. 1 shows in block diagram form the interrelationship between the various elements of the exemplary embodiments of the invention.
Figure 2:
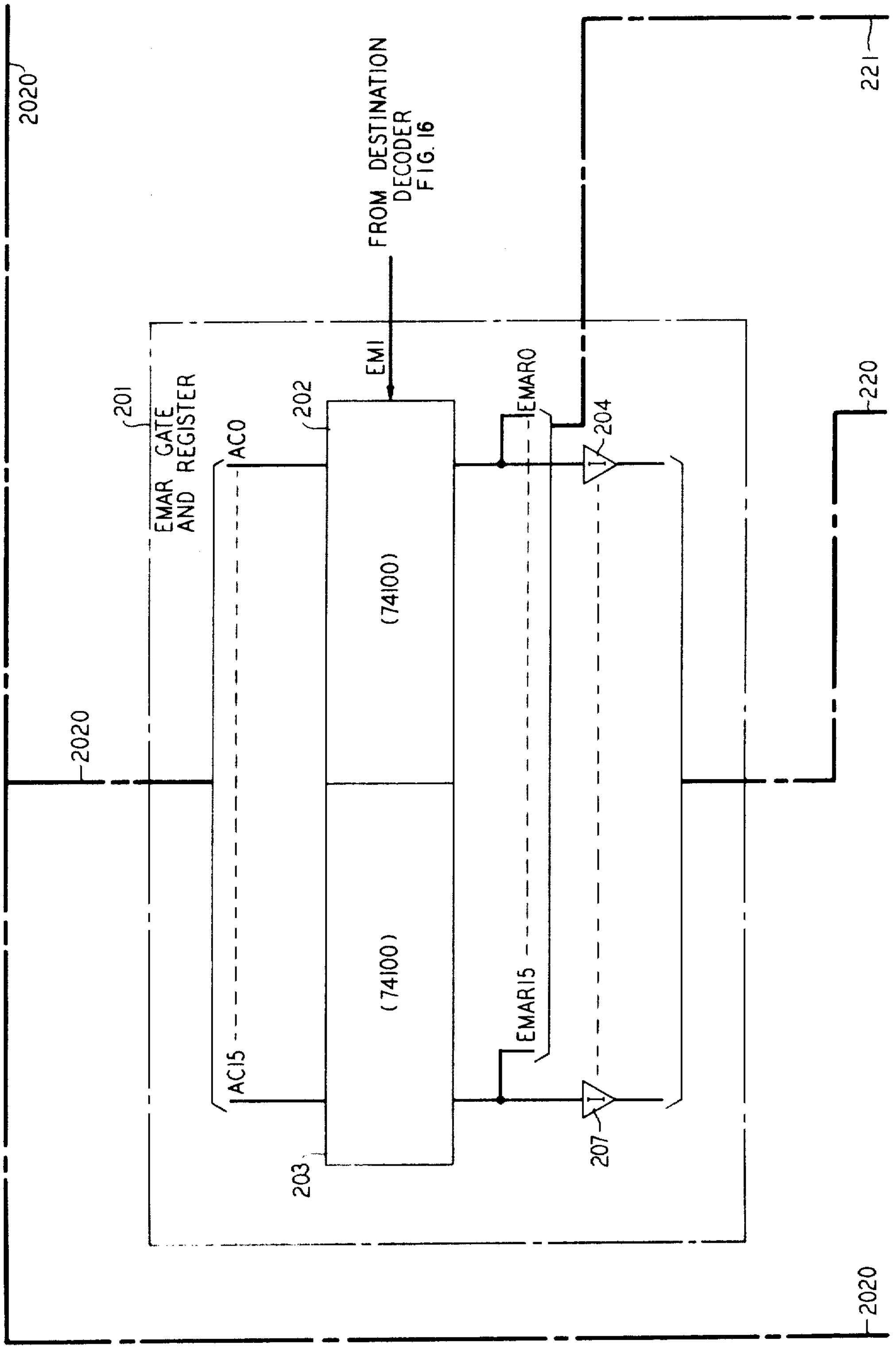
FIG. 2 through FIG. 23 are schematic drawings showing in greater detail the interrelationship of the exemplary embodiment of the invention.

It will be noted that in FIG. 2 through FIG. 23 the various components and apparatus shown have been given systematic designations, thus, the first digits of the element number correspond to the figure in which that element is shown while the first digits of any cable represent the figure in which the majority of the leads of that cable originate. For example, element 801 would be found in FIG. 8 and element 1101 would be found in FIG. 11 while cable 2120 would be a cable extending from FIG. 21.

In order to further facilitate understanding of the invention, the description of the operation of the exemplary embodiment has been subdivided into a general description portion designated 1.0 and a detailed description portion designated 2.0. Section 1.0 describes the invention in general terms with respect to FIG. 1, while Section 2.0 and its subsections describe the invention in detail with respect to FIG. 2 through FIG. 33.

As a further aid to the construction of a processor to perform the functions of our invention the numbers in parentheses in certain of the elements shown in FIG. 2 through FIG. 23 are integrated circuits commercially available. One source of data on the exact configuration of each of these circuits is *The Integrated Circuits Catalog for Design Engineers*, published by Texas Instruments, Inc. It should be noted however that numerous circuit packs and apparatus may be utilized advantageously other than those specifically set forth so long as each element is arranged to perform the function hereinafter to be described therefor.

SYSTEM ORIENTATION

Prior to becoming involved in the various details of the particular system shown, it should be noted that primarily this invention is directed to the translation of microprogram instructions by a translator memory. The microinstructions are obtained from a program memory in sequential fashion in response to address locations supplied to the program memory. For purposes of illustration, this relationship will be demonstrated with a 24-bit 64-word read-only translation memory. The words of the translation memory are addressed by a 6-bit binary operational (OP) code obtained from bits 10 through 15 of the microinstruction supplied by a 16-bit 256-word program memory. It is important to keep in mind that the number of bits per word in each memory and the number of words per memory have been arbitrarily selected and may be varied to suit the particular application to which the computer system is directed.

In an endeavor to reduce the space required and to facilitate an understanding of this invention the peripheral buses have been selected to contain 16 paths or lines, and it should be noted that the buses can be any number of lines without changing the configuration or operation of the processor.

Also, it should be noted that computer programmers and designers in the course of the and have developed great sophistication in optimizing the usefulness of any computer configuration. No attempt has been made in the description of the operation of the disclosed computer orientation to exhibit the maximum degree of sophistication to which our machine is capable for to do so would hinder instead of help one newly acquainted with the art to understand the theory and operation of the translation process to be described. Accordingly, the program chosen to illustrate the various features and functions of the machine is a basic addition, subtraction and multiplication program of a type well known in the art ad has been chosen to demonstrate the operational aspects of our invention.

It is contemplated that the computer organization of our invention will find widespread use in applications where a limited number of processes are operable on a large amount of data. For example, the inputs to the system could be from a number of telephone stations, each associated with a particular line on the input bus. The machine would follow a microinstruction routine which would allow data to be processed over each line individually. In a typical situation this would be accomplished by interfacing a computer using our concepts of translation with a conventional computer controlled processor to perform the actual switching function between telephone stations. The exact manner in which this data interchange takes place will be more fully detailed hereinafter.

1.0 GENERAL DESCRIPTION

Turning now to FIG. 1, program memory 1301 contains the microinstruction sequence for controlling the entire system. Certain bits, the OP code bits which comprise the OP code field, are translated by a translator memory 501 to provide in an unpacked manner without decoding the actual system control signals. The remaining bits of the program memory microinstruction specify the addresses of the source and destination registers from which and to which information is to be moved. Information is placed on the source bus 1520 via multiplexer 1501 from any of the various source registers connected thereto. The particular source register from which the information is retrieved is controlled by the source address field bits of the microinstruction.

For example, assume information is to be retrieved from EMSR register 401. Then the source address field of the controlling program memory microinstruction would contain bits representing register 401. During the proper clock phase, the multiplexer would connect the output leads, cable 420, of EMSR register 401 to the 16 leads of source bus 1520 in a one-to-one relationship so that the first lead from EMSR register 401 is connected to the first bus lead and the last lead from register 401 is connected to the last lead of the bus.

The information on the source bus 1520 is then provided to the input of rotate circuit 1801 which circuit is arranged, as will be detailed hereinafter, to provide information to arithmetic logic unit 2101 on 16 leads either in a one-to-one relationship (no rotation) or in a rotated manner, each bit shifted a specified number of places to the left. The information in the arithmetic logic unit 2101 may be logically operated upon in a variety of ways as will be discussed hereinafter. The output of the ALU is provided to the input of accumulator (ACC) register 2001, the output of which register forms the input to destination bus 2020.

The destination field portion of the microinstruction, as obtained from the program memory, specifies via destination decoder 1601, a particular destination gate and destination register for receiving the information from the output of accumulator 2001. For example, if the information in the ACC is to be stored in the scratch pad memory address register (SPAR) 802, the destination portion of the microinstruction would specify SPAR gate 801, thereby enabling SPAR gate 801 and connecting the destination bus to SPAR register 802 which register is in turn utilized to control the addressing of scratch pad memory 901.

2.0 DETAILED DISCUSSION

Figure 5:
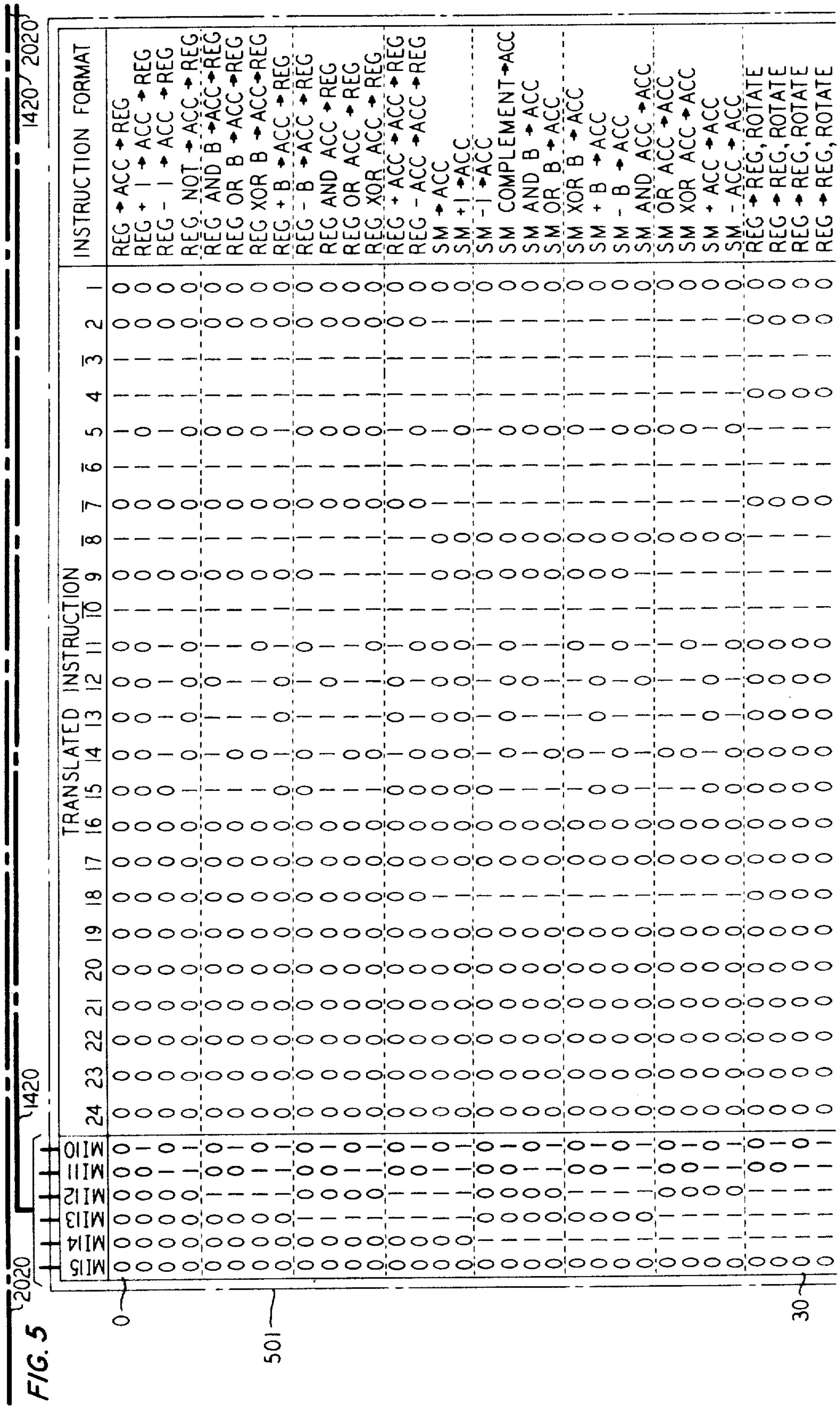
Figure 6:
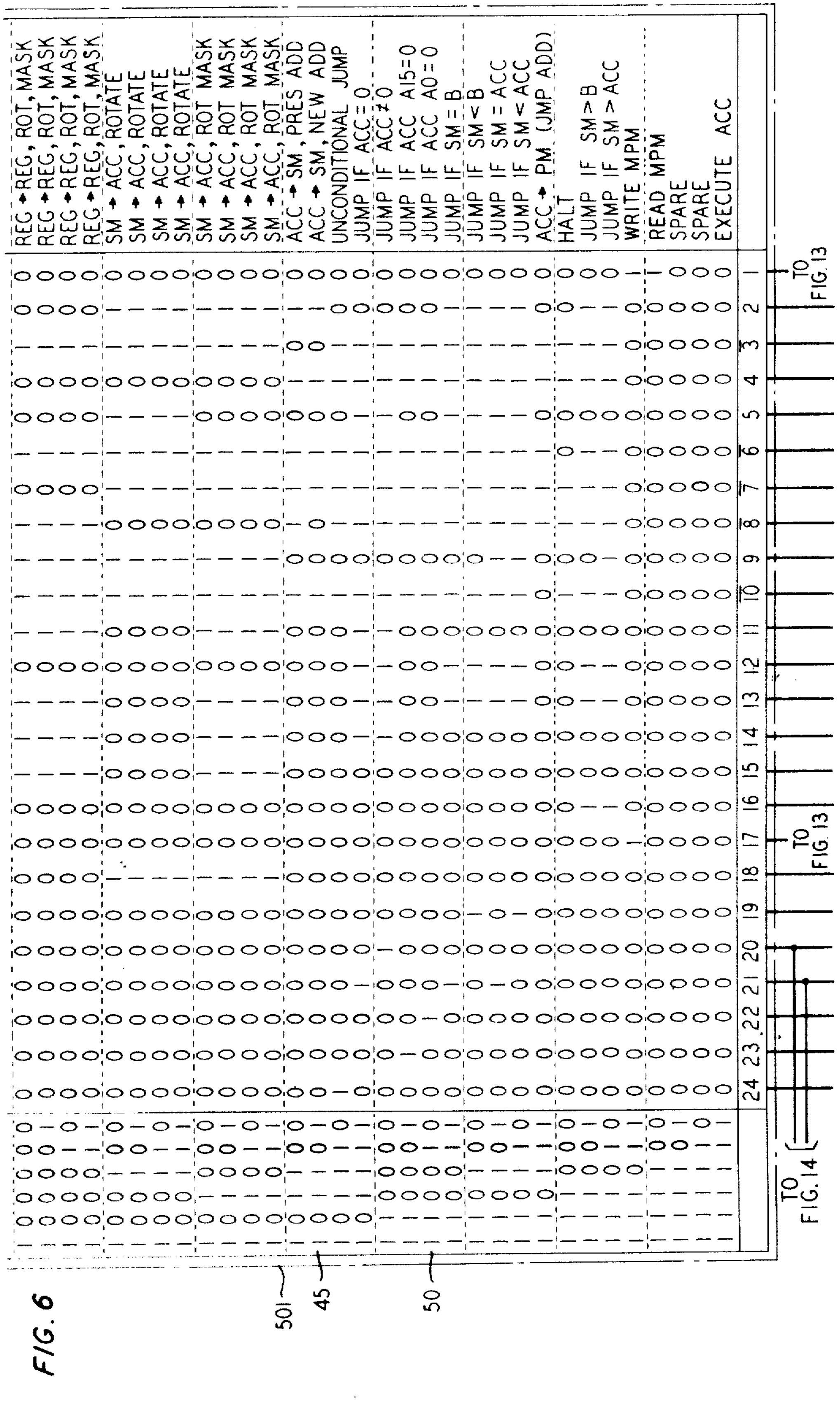

In order to demonstrate the operation of a computer arrangement utilizing the translation procedures of our invention, a program routine will be detailed for accepting two numbers from an external source and performing either addition, subtraction or multiplication with respect to those numbers and thereupon returning the result to an external register. The precise function to be performed between the numbers will also be determined and communicated to the machine from some external source, such as an external memory, to illustrate the manner in which our machine cooperates with external control devices. FIG. 33 shows the program utilized to accomplish this routine together with a binary representation of a part of the program memory containing this program. FIGS. 5 and 6 show the 24-bit 64-word read-only translator memory with information bits arranged in a particular manner. As will be more clearly understood from that which is contained hereinafter, each word as well as each bit of each word of the translator memory is independent from all other words and bits and the sequence and position in which these words and bits are shown in the memory have been arbitrarily selected.

Turning now to FIG. 33, it may be helpful at this point to review the layout of the program memory (PM) 1301. The numbers under the address portion are written for purposes of clarity in decimal notation. However, in a typical situation these numbers would be represented by binary codes typically having 9 bits. Thus, address (or step) 1 could be represented as 000000001. The program memory operates in a conventional manner such that upon receipt of the binary address the 16 bits associated with that address are available at the output of the memory.

The 16 bits associated with each address have been selected to provide the program discussed above and it should be remembered that many such programs may be stored in the program memory concurrently, each being called into operation upon the selection of the various address locations in the program memory, as will be detailed hereinafter.

There are numerous methods of arriving at the first address location of a sequence of microinstructions making up any selected program. One such arrangement is by a jump instruction from some other program. Another such arrangement for beginning a particular program is by communicating the address location of the first step of the desired program to the program memory. This latter arrangement is the one we will use for illustrative purposes at this point to illustrate the initial selection of the program shown in FIG. 33.

2.1 CLOCK CIRCUIT

Figure 11:
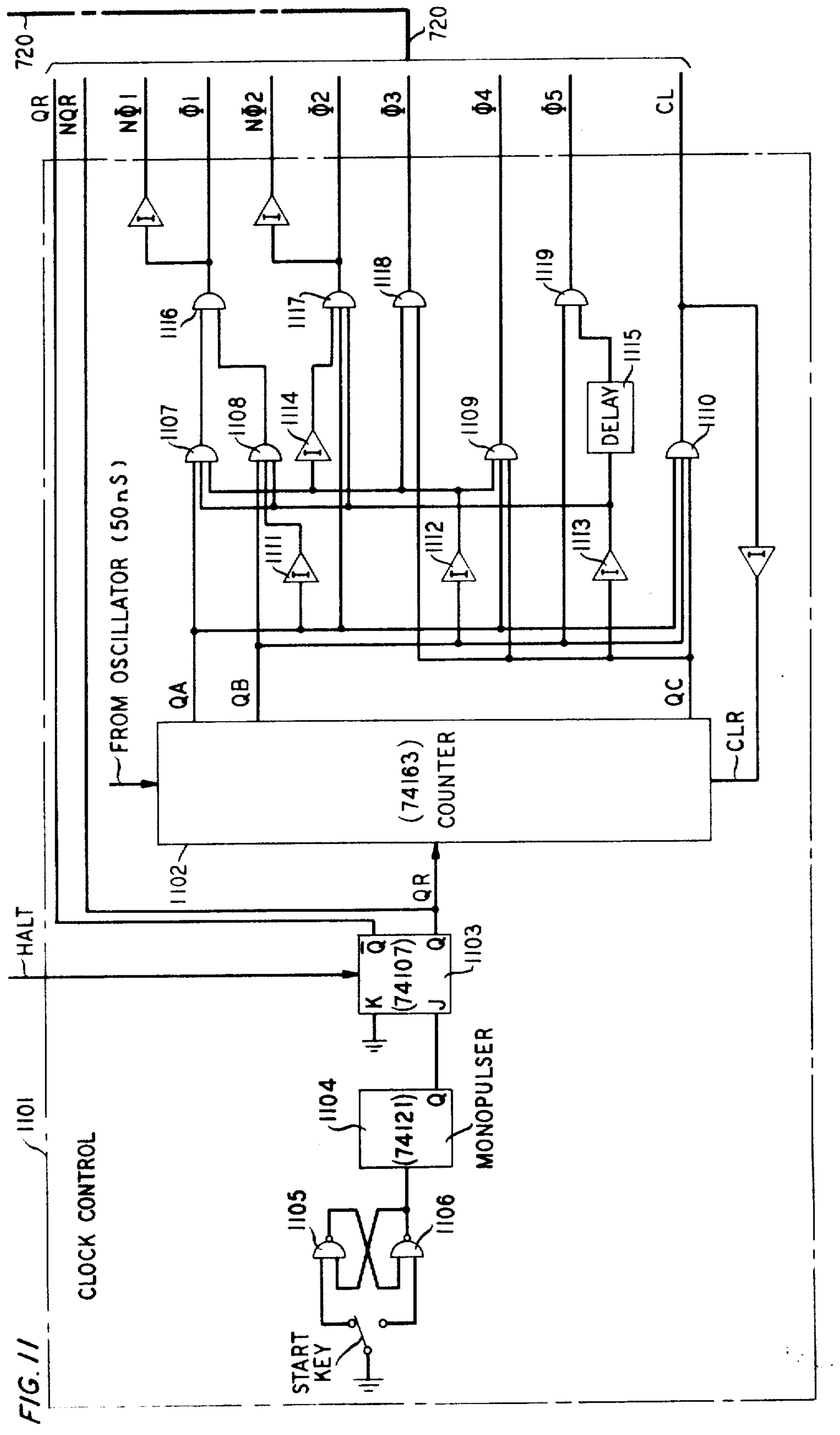
Figure 31:
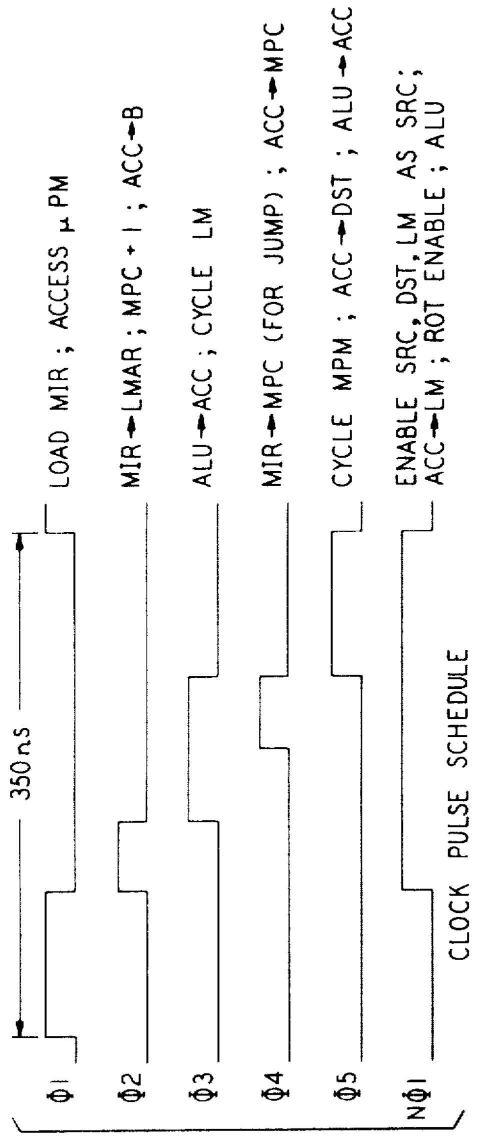
FIG. 31 is a chart showing the clock pulse schedule and the elements controlled during each phase of the clock.

Prior to beginning a discussion of the desired program it may be helpful to review the operation of the clock control circuit 1101, FIG. 11. Accordingly, as shown in FIG. 11, counter circuit 1102 operates from a 50-nanosecond oscillator to provide binary outputs on leads QA, QB, and QC. These outputs are decoded to provide clock pulses on leads $\Phi1$ through $\Phi5$. As shown, the leads N$\Phi1$ and N$\Phi2$ are the complement of $\Phi1$ and $\Phi2$ respectively. The precise timing arrangement between pulses on each of these leads is shown in FIG. 31.

Counter 112 is arranged to perform the counting functions from the oscillator whenever the input is high. Accordingly, the clock control circuit 1101 only functions when flip-flop 1103 is set. This flip-flop is set by the enabling of the start key which causes the output of gate 1106 to go low thereby enabling monopulser 1104 to provide a single pulse output to set flip-flop 1103. Flip-flop 1103 becomes reset upon receipt of a pulse on the HALT lead input thereto. It should be noted that the reason for the monopulser between the start key and flip-flop 1103 is for the purpose of ensuring that whenever a HALT pulse is received flip-flop 1103 will be able to reset even if the start key had remained operated from an initial start command.

We shall assume at this point that whenever the clock control circuit 1101 is halted the CL lead output therefrom is high. Also, since flip-flop 1103 is reset, lead NQR is also high when the clock is stopped. We shall also assume at this point that an auxiliary manual source is available for selectively providing inputs to the machine. In order to select the address location in the program memory corresponding to the first microinstruction of the program desired it is necessary to transfer to the registers controlling the program memory the information representative of the address location desired.

2.2 DESTINATION SELECTION

Figure 16:
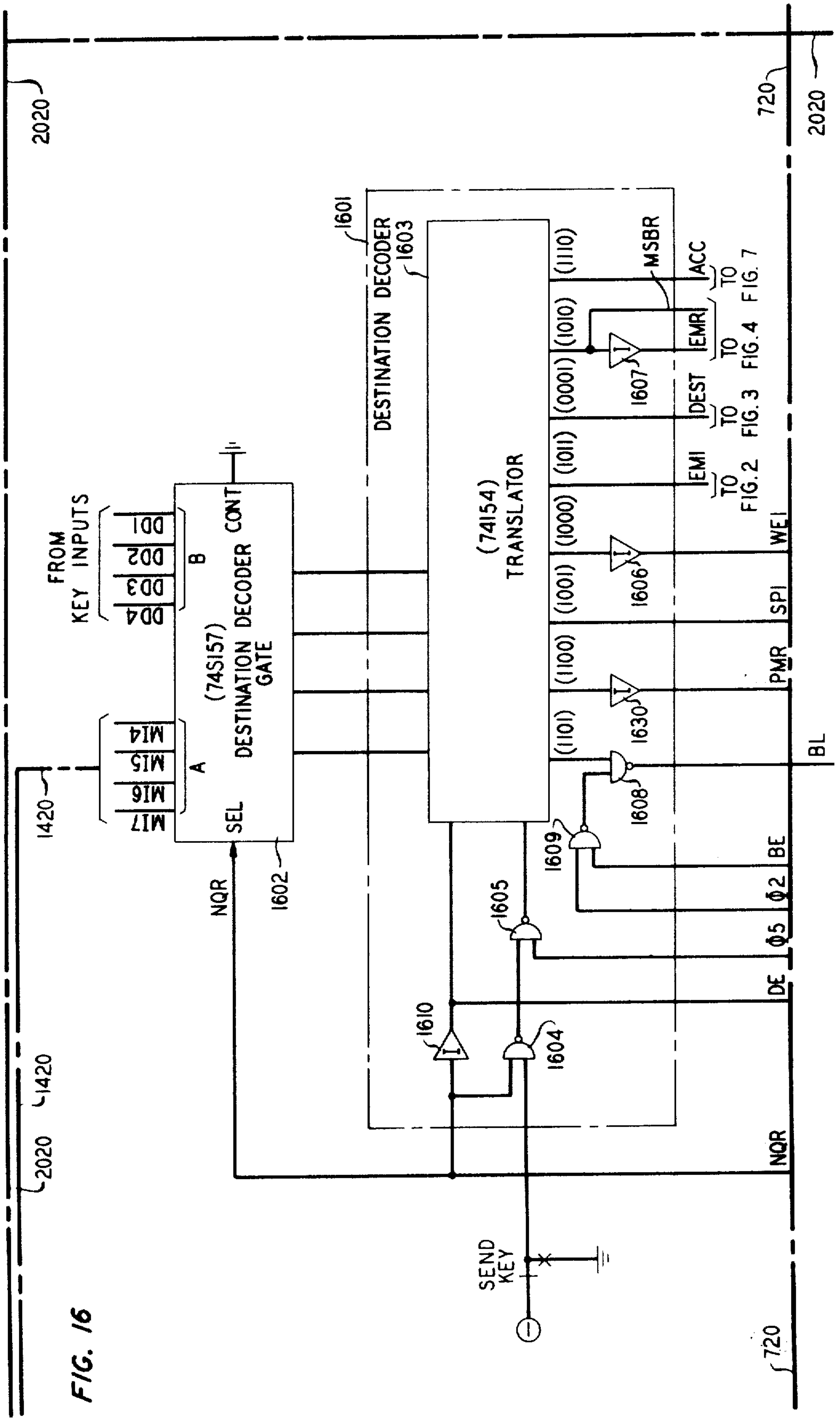
Figure 17:
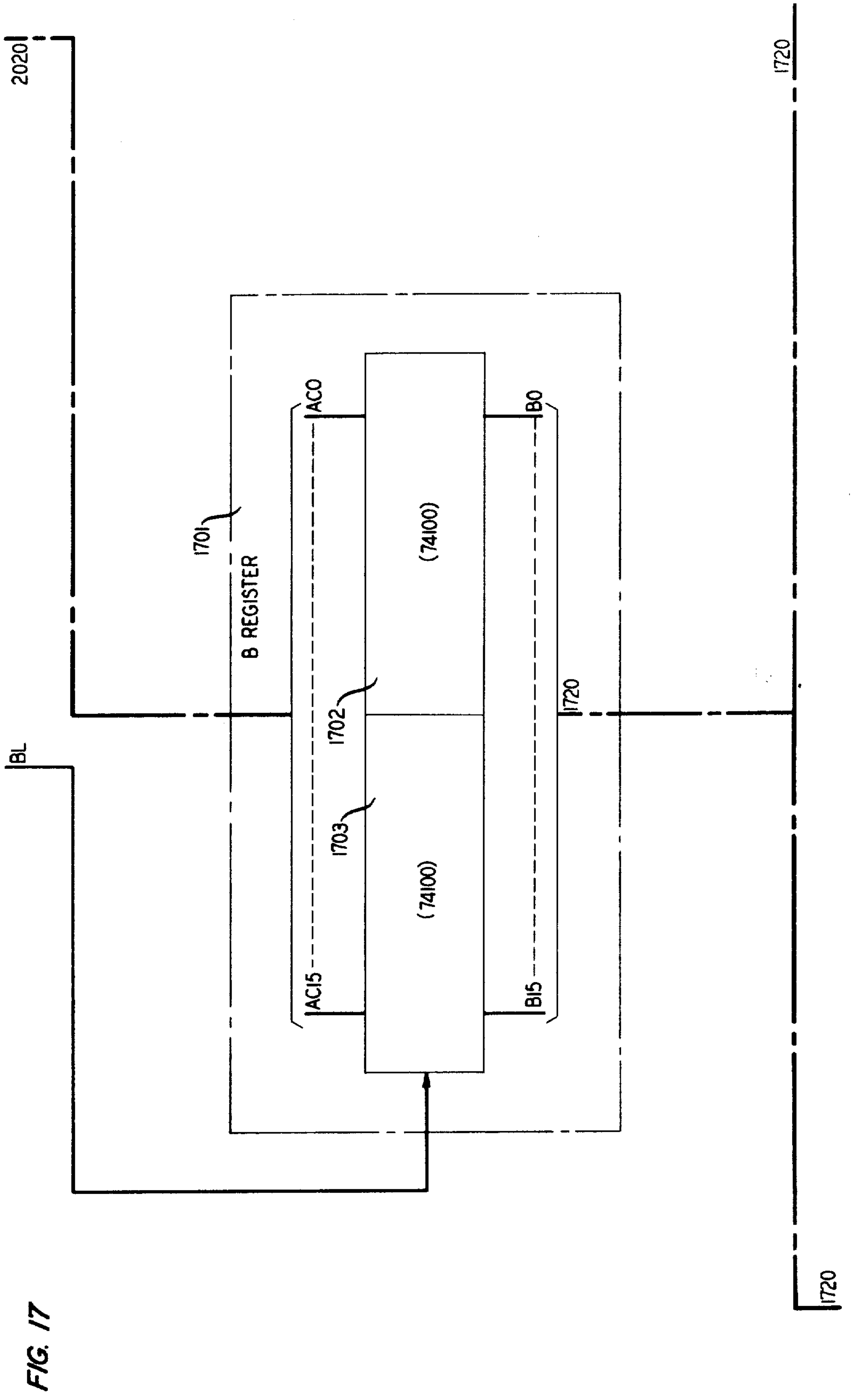

Turning now to FIG. 16, destination decoder 1601 is arranged such that input signals on leads A through D are decoded to provide a unique output on any of the output leads. Thus, each of the output leads can be thought of as having a binary coded representation as shown. For example, the PMR lead, which is the lead controlling the program memory register, will go high whenever the inputs on leads A, B, C, and D have the binary code 1100 thereon if both inputs of translator 1603 are high.

Destination decoder (DD) gate 1602 is a multiplex gate such that either one or the other of a dual input multiple can be extended therethrough. Whenever the control input is low and the select input is low the information on the A input leads, in this case leads MI4, MI5, MI6, and MI7, are extended through DD gate 1602 to leads A, B, C, and D, respectively. When the control input is low, and the select input is high information from the B input leads, which in this case are leads DD1, DD2, DD3, and DD4, are extended through gate DD 1602 to leads A, B, C, and D, respectively. If ground were to be removed from the control input, information would not be passed through the gate regardless of the status of the select input lead. Accordingly, since as discussed previously the NQR lead which has been extended via cable 720 from the clock control circuit, FIG. 11, is now high and since the control input of DD gate 1602 is permanently low, input B is connected through gate DD 1602. Thus, since it is desired to transfer the externally provided address information to the program memory it is necessary to select the program memory address register (PMAR) gate 1201. Thus, the inputs on the keys (not shown) are set such that lows or 0s appear on leads DD1 and DD2 while highs or 1s appear on leads DD3 and DD4. Thus, at this point lead A has a 0, B has a 0, C has a 1 and D has a 1 forming binary word 0011. Since the NQR lead is high input 19 to the translator 1603 is low via inverter 1610. Because of the high supplied by the send key, the output of NAND gate 1605 is high and translator 1603 is inoperative to perform the translating function.

Figure 20:
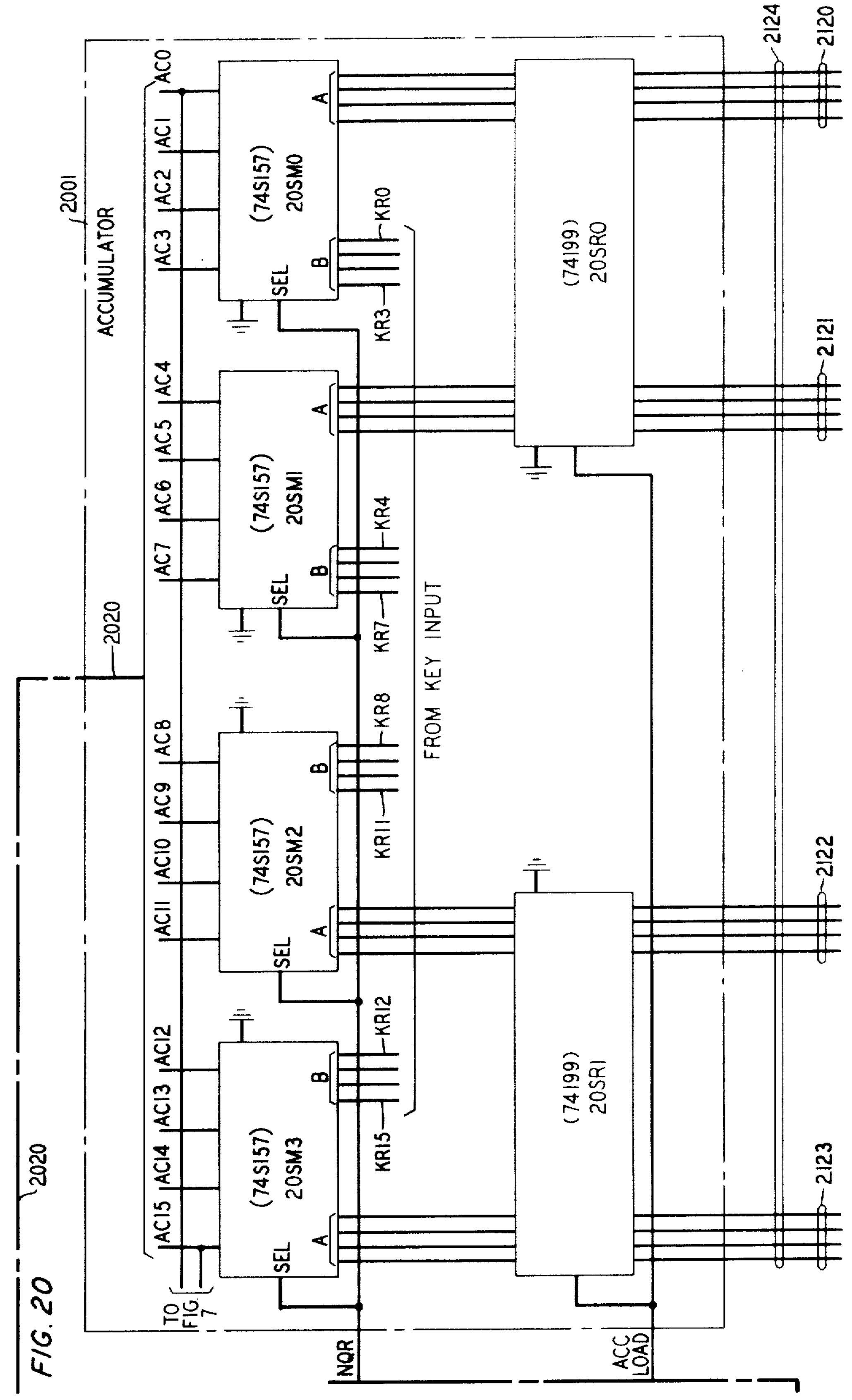
Figure 21:
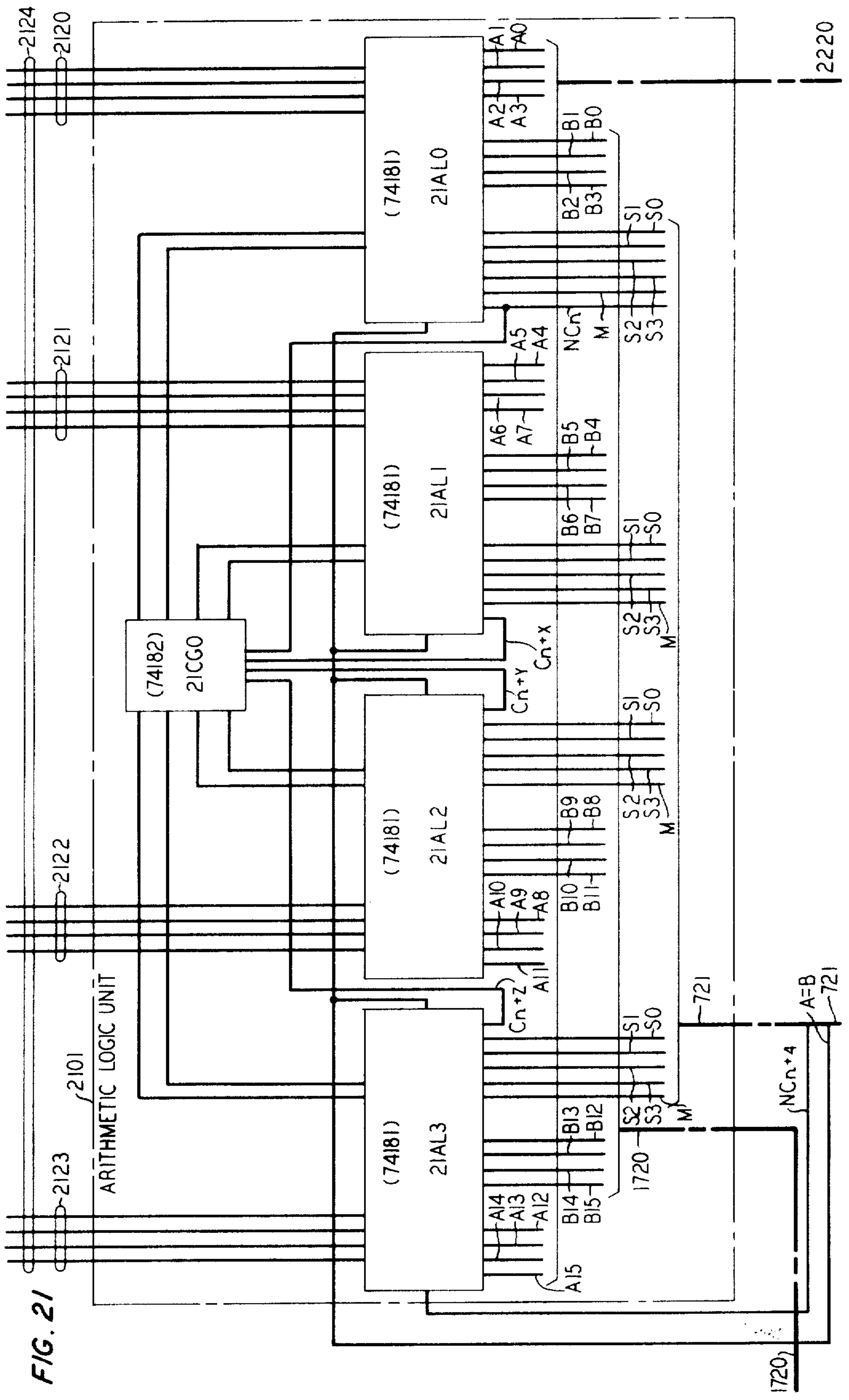
Figure 22:
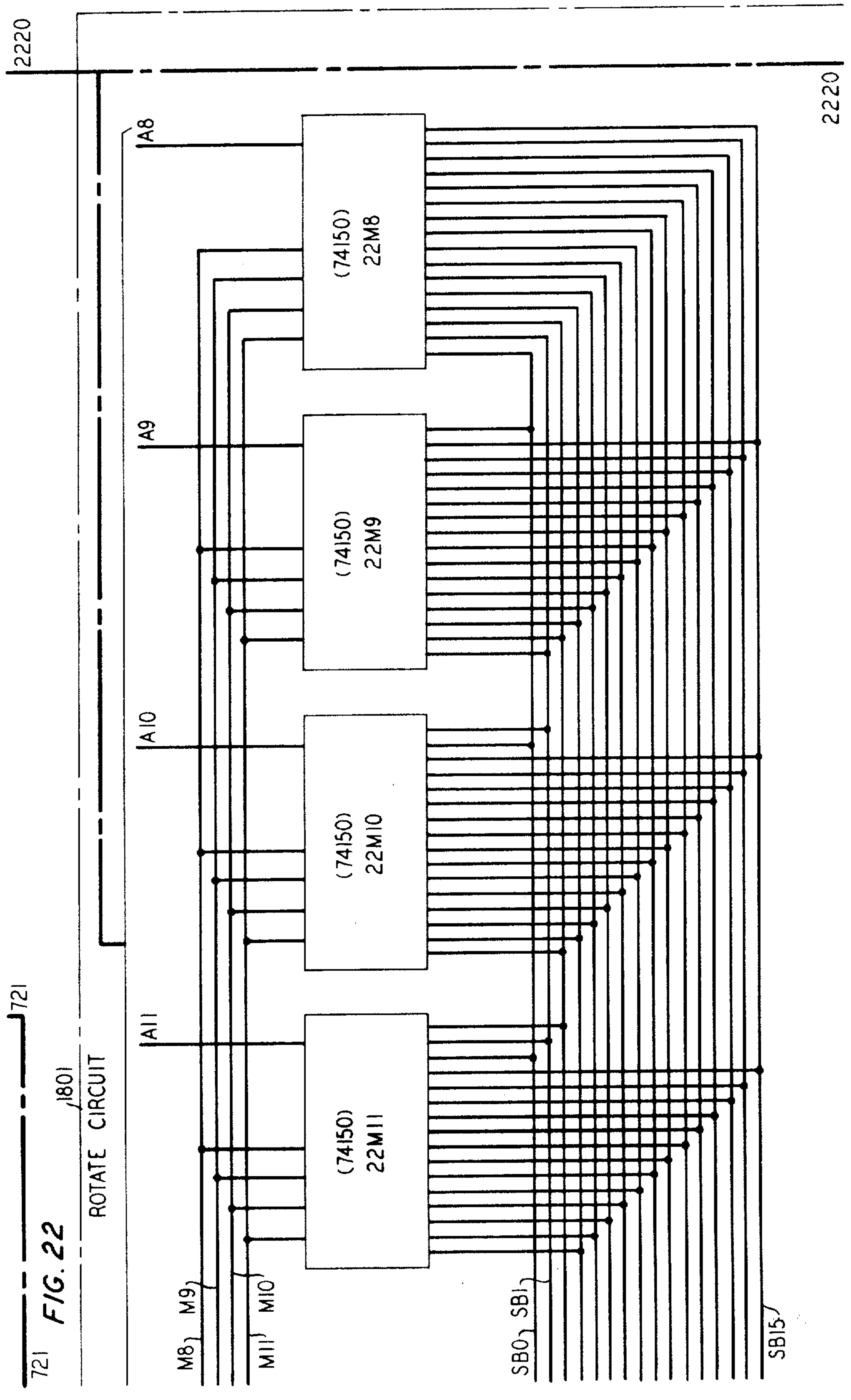
Figure 23:
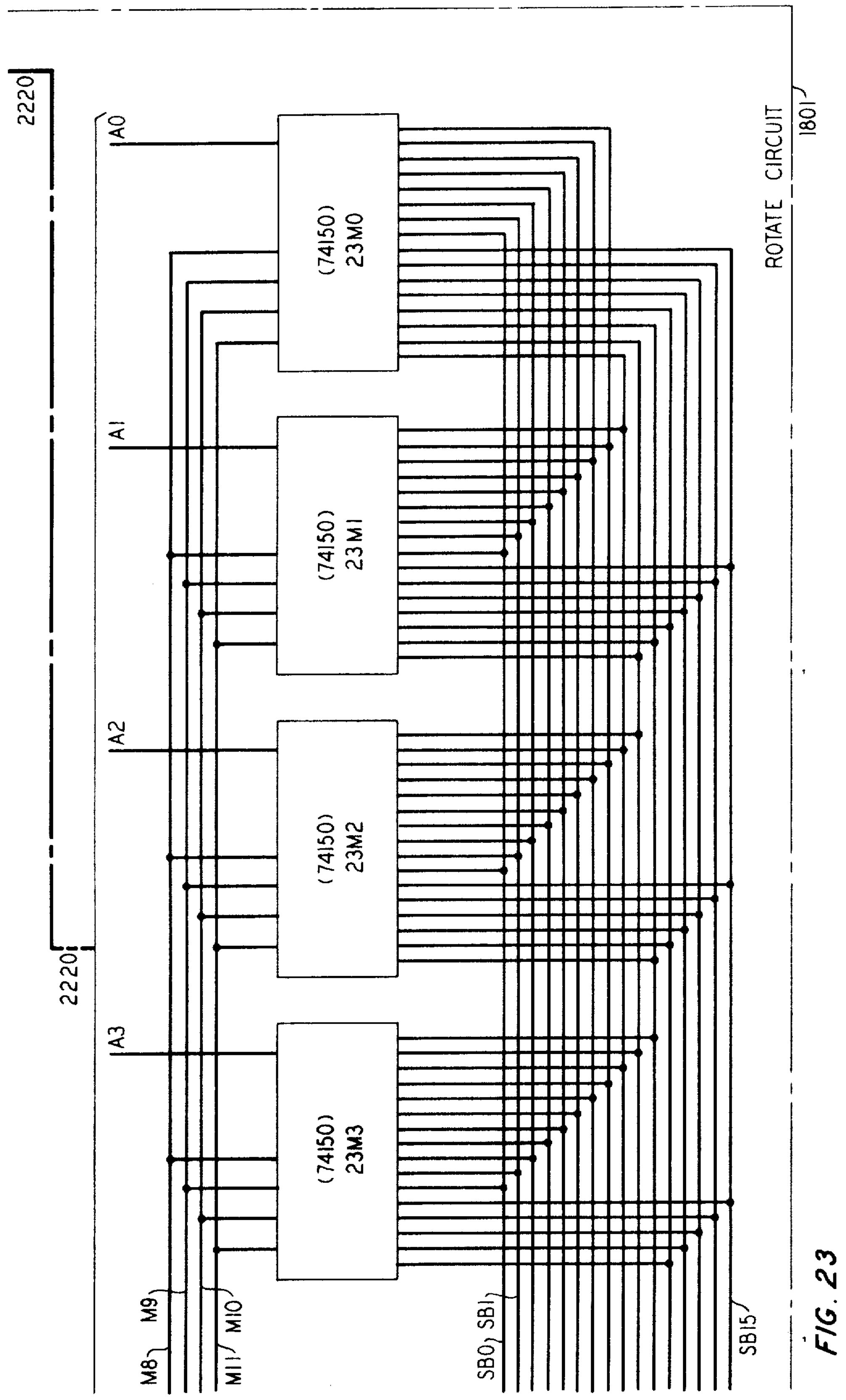
Figure 24:
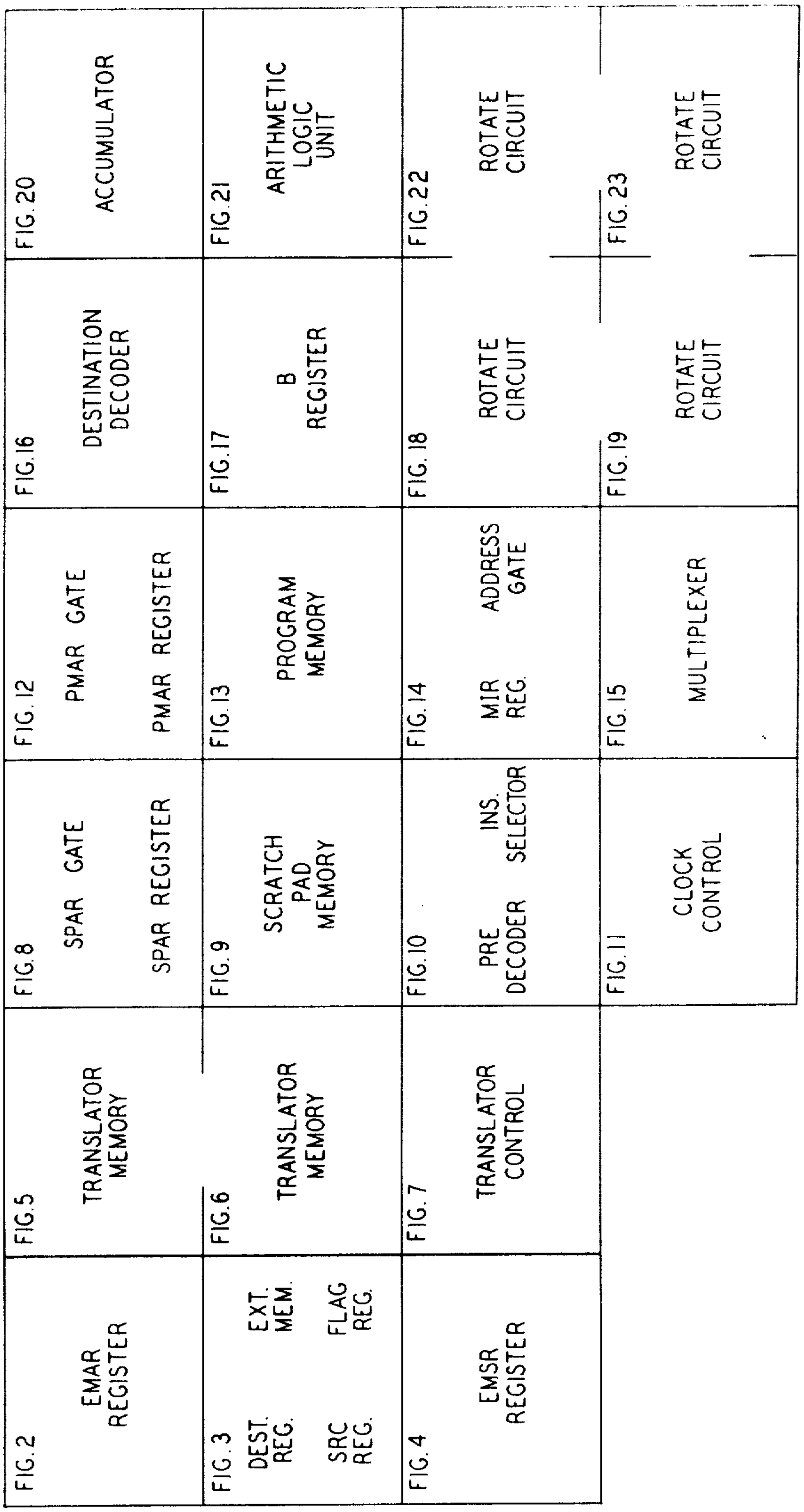
FIG. 24 shows the manner in which FIG. 2 through FIG. 23 should be arranged and also describes the functional relationships of the various Figures.

Turning now to FIG. 20 and assuming that it is desired to select address 000000001 in the program memory which address corresponds to the first location therein, the external keys (not shown) would be set to provide a high on lead KR0 and grounds on the remainder of the KR-leads. Gates SM0, SM1, SM2, and SM3 are arranged in the same manner as DD gate 1602 previously discussed and accordingly since the select input is high, as provided by lead NQR from cable 720, the inputs supplied by the key are extended through SM0-SM3 gates and over the AC0 through AC15 leads of destination bus 2020.

It will be recalled that leads AC0 through AC15 are the output leads from accumulator 2001 which leads form the input to destination bus 2020 and information on these leads is transferable to any selected register under control of destination decoder 1601. Accordingly, at this point the AC0 lead of bus 2020 is high while the remainder of the leads are low. This follows since the only high provided from the key input is on the KR0 lead, FIG. 20, as previously discussed.

2.3 TRANSFERAL OF INFORMATION

When the external inputs are set for selection of the first address location in the program memory, the send key is operated. As shown in FIG. 16, the operation of the send key provides a low to one of the inputs of gate 1604, causing the output of that gate to go high. Since both inputs to NAND gate 1605 are now high, input 18 to translator 1603 goes low thereby enabling the translator. Since as discussed previously the inputs A–D to destination decoder 1601 contain the code representative of the program memory address register (1100) the output associated therewith provides a low to inverter 1630 thereby providing a high on lead PMR. The high on lead PMR is extended via cable 720 to FIG. 12 to one of the inputs of NAND gate 1214. Since the other input to NAND gate 1214 is also high from the NQR lead, the output thereof goes low causing the output of NAND gate 1212 to go high causing the output of inverter 1213 to go low. This low is supplied to the input of counter registers 1206, 1207, and 1208, which registers are arranged to accept information on a parallel basis from PMAR gate 1201 only when input 11 is low and further arranged, in a counter fashion, to increment the binary value of the information currently stored therein by 1 upon receipt of a low-going pulse on input 5.

Since the parallel load input from inverter 1213 is now low, counter registers 1206, 1207, and 1208 accept information from PMAR gate 1201 via PM gates 1203, 1204, and 1205. PM gates 1203, 1204, and 1205 are arranged in a multiplex manner, as discussed previously for DD gate 1602. Thus, since the select inputs are low, as controlled by the outputs of inverters 1209 and 1210 from highs on leads JL and NQR, information from the A inputs is loaded through the PM gates to PMAR register 1202.

The A input to the PMAR gate 1201 is connected to the AC0 through AC8 leads of destination bus 2020 from accumulator 2001. Thus, a portion of the destination bus information is extended to counter registers 1206, 1207, and 1208 of PMAR register 1202. It will be recalled that information on destination bus 2020 is in the form 000000001 with the rightmost bit being the AC0 bit. Since the outputs of counter registers 1206, 1207, and 1208 reflect their inputs, leads MPC0 through MPC8 contain the information word 000000001, with the rightmost bit being the MPC0 bit. This information is transferred via cable 1220 to FIG. 13 and via multiplex PM gate 1343 to the address input of program memory 1301 via drivers 1304, 1305, and 1306. The memory address drivers function in the well-known manner to address a particular location in the memory such that the information word stored at that location becomes available on the output leads MP0–MP15 of the memory. At this point the select lead to the multiplex PM gate 1343 is high and thus the A input (leads MPC0–MPC8) is extended to the drivers.

In our illustration, the decoded binary value of 000000001 corresponds to address location 1 in program memory 1301. The information stored at address location 1 is then communicated over output leads MP0 through MP15 and cable 1320 to FIG. 10 to the input of instrcution selector 1001. Certain of these leads are also supplied to the input of pre-decoder 1002 which is arranged to check those leads to determine if all of the leads have 1s thereon. In such an event, the instruction selector would respond to the low provided by NAND gate 1007 by accepting information over the A input from the leads AC0–AC15. FIG. 33 shows the exact bits stored at step 1 (address location 1) in our example and thus bits 10–15 are not all high and thus instruction selector 1001 accepts the B input for transferal to leads MIR0 through MIR15. Since the control lead to instruction selector 1001 is permanently low, the MIR0 through MIR15 leads now contain the information supplied from the program memory via the MP0 through MP15 leads of cable 1320.

Figure 14:
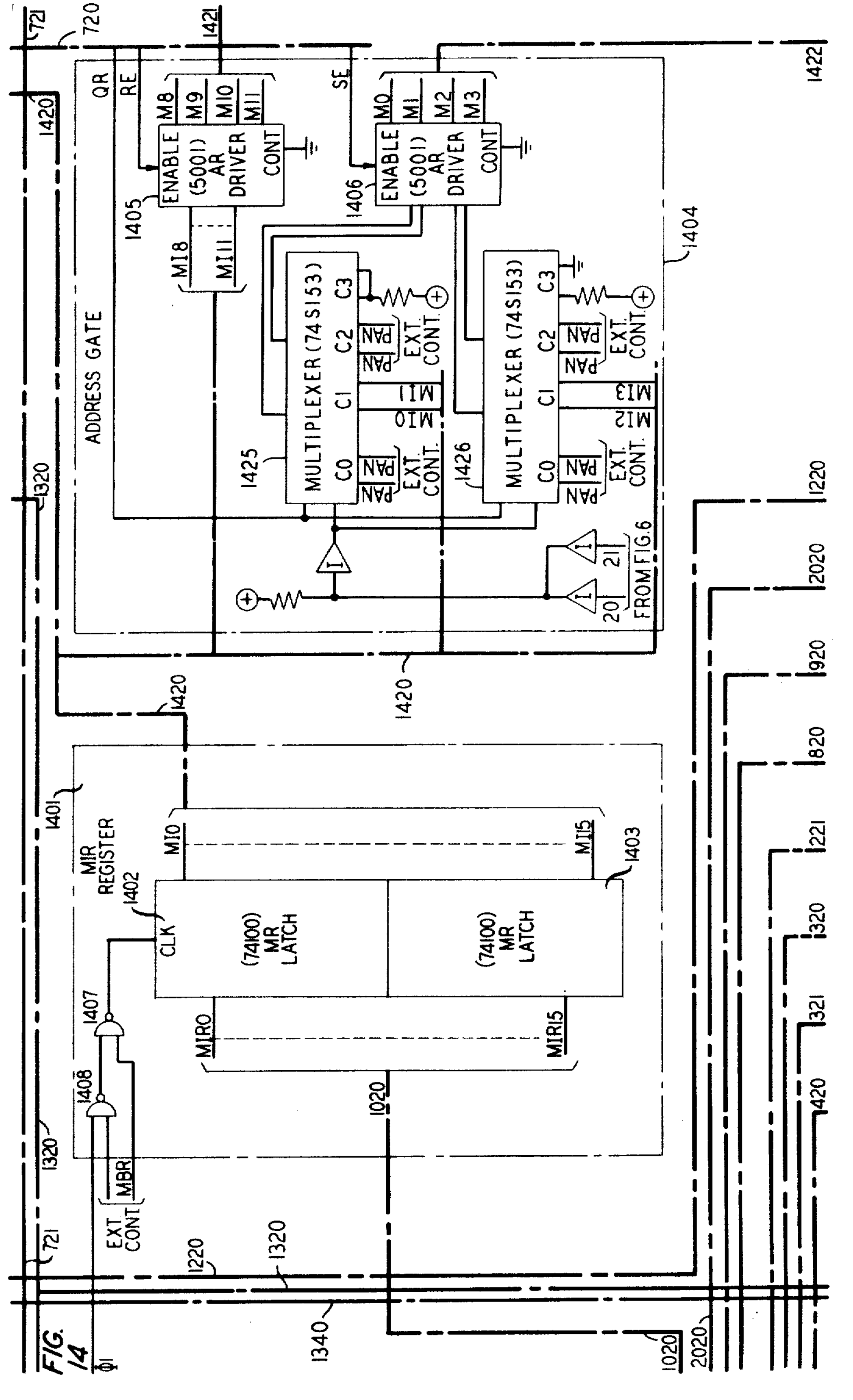

The output from instruction selector 1001 is supplied over cable 1020 to FIG. 14 to MIR register 1401. The MR register latches 1402 and 1403 function as flip-flops to provide information on output leads MI0 through MI15 corresponding to information provided on the respective input leads MIR0 through MIR15 when the clock input goes high. When the clock input goes low the information on the outputs is retained until such time as the clock input again goes high. The unconnected inputs to gates 1408 and 1407 are high at this point and thus since lead Φ1 from clock control 1101, FIG. 11, is low the clock input to MR latches 1402 and 1403 is also low. Therefore, the output information on leads MI0 through MI15 is information which is invalid for use at this time.

2.4 CLOCK PHASE 1

Figure 27:
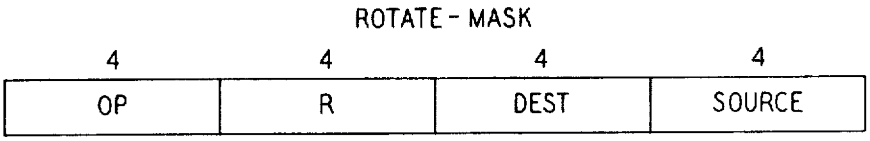

Turning again to FIG. 11, upon operation of the start key the $\overline{Q}$ output of flip-flop 1103 goes low thereby causing lead NQR to be low. At the same time the Q output of flip-flop 1103 goes high allowing counter 1102 to provide sequential outputs. Thus, during phase 1, which phase occurs for the relative time shown on FIG. 31, output Φ1 is high, while output NΦ1 is low. The Φ1 output is extended over cable 720 to FIG. 14 causing the clock input to MR latches 1402 and 1403 to go high thereby causing leads MI0 through MI15 to reflect the information provided from step 1 of program memory 1301 on leads MIR0 through MIR15. Thus the information on leads MI0 through MI15 at this time is the information obtained from the microprogram memory address location 1 and is, as shown in FIG. 33, starting with the least significant bit at the right the word formed on leads MI0 through MI15 is as follows: 011110/0011100010. Continuing in FIG. 14, leads MI0 through MI3 are extended to multiplex gate 1406. Since, as will be discussed, the first instruction from the program memory is a register-to-register rotate instruction, the format of the micro instruction is as shown in FIG. 27. Thus leads MI0–MI3 represent source register bits and are used to control multiplexer 1501 in the manner to be detailed so that information may be retrieved from the selected register and be placed on the source bus 1520. The select lead SE to the AR gate 1406 is controlled from the translator memory 501 as will be shown.

Leads MI8 through MI11 (program memory bits 9–12) of MIR register 1401 are extended to multiplex gate 1405 and, as shown in FIG. 27, these leads are used to control the rotate function under control of lead RE from translator memory 501.

Leads MI4 through MI7 (program memory bits 5–8) of MIR register 1401 are extended over cable 1420 to FIG. 16 to the A input of DD gate 1602. The information on these leads is used to route the output of the accumulator to the desired destination via the destination bus during the proper phase of the clock, under control of translator memory 501 in a manner to be shown hereinafter.

Returning again to FIG. 14, leads MI10 through MI15 from MIR register 1401 are extended via cable 1420 to FIG. 5 to the input of translator memory 501.

The bits on these leads are the OP code bits from the currently operative step of the program memory and as such are used to select a word in the translator memory corresponding to the binary value of the bits provided. Thus, since the OP code provided from program memory 1301 for step 1, as shown by FIG. 33, is 011110, the 30th word in translator memory 501 is addressed and the bits stored thereat are made available at the output, FIG. 6, of the memory. As shown in the instruction format for the 30th word, that word controls the register-to-register rotate function of the machine.

Figure 32:
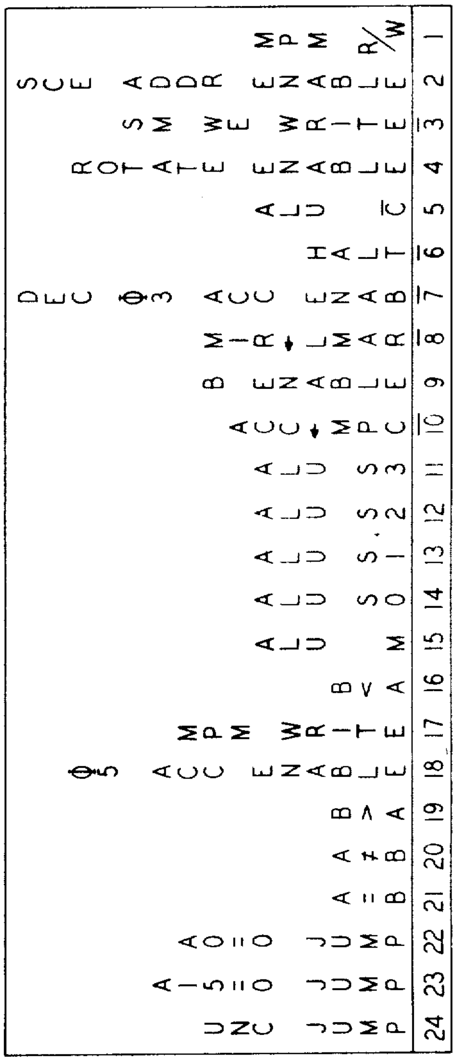
FIG. 32 is a chart showing the function controlled by each bit of the translator memory.

It may be helpful at this time to utilize FIG. 32 by moving that figure so that the bottom line thereof is directly above the 30th word of translator memory 501, FIG. 5, so that the function controlled by each bit of the translator memory is readily available for reference.

2.5 PROGRAM MEMORY STEP 1

Figure 13:
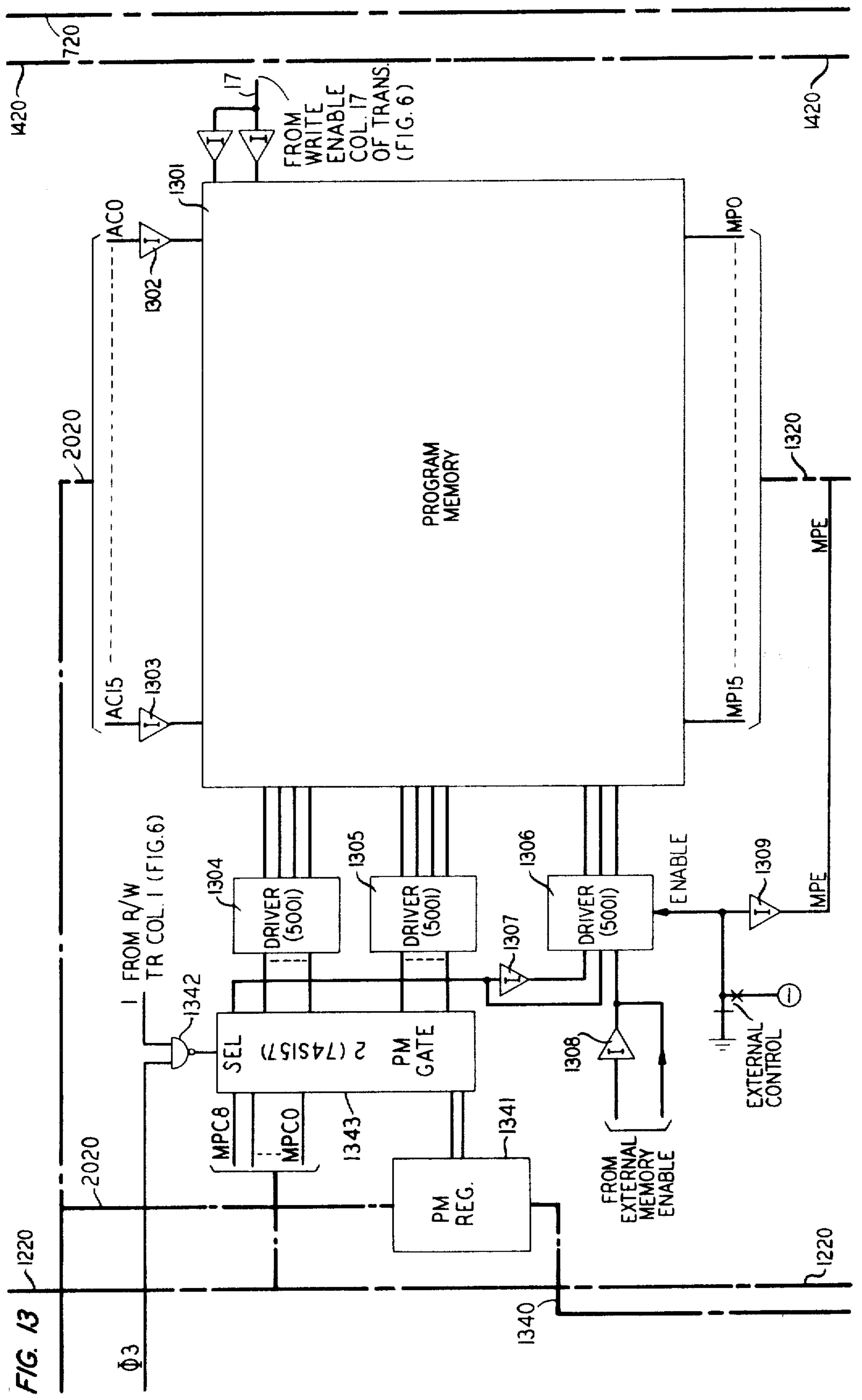

As discussed, under external key control the program memory, FIG. 13, has been addressed at location 1 therein. Accordingly, as shown in FIG. 33, step 1 of the selected program is one in which information is retrieved from the flag register, rotated left 15 places (L15) and brought to the accumulator. Thus step 1 of the program is a rotate instruction and is arranged in the format shown in FIG. 27, with the four rightmost bits specifying the address location of the source register, the next four bits specifying the address location of the destination register, the next four bits specifying the number of positions the information from the source is to be rotated, and the last four bits on the left being the OP code bits.

Figure 28:
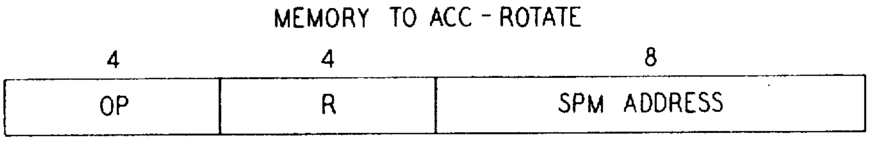

It should be noted that since the OP code in our arrangement is in actuality an address location in the translator memory, the OP code for all instruction formats must contain the same number of bits. However, as shown in FIG. 27 and FIG. 28, two bits of the OP code are utilized for controlling the rotate function. These two bits are the least significant bits of the 6-bit OP code and are eliminated from use in each instruction in the translator memory which could conflict with the use of the rotate bits for controlling the rotate function. Thus, as an example, on FIG. 5 it will be noted that words 28 through 31 all control the rotate function and thus each of the words stored at those locations is identical and accordingly regardless of which bits are in the least significant location of the address, the same word will be supplied by the translator memory. This is also true for words 32 through 35, 36 through 39, and 40 through 43, all of which words control rotate functions.

2.6 OPERATION OF TRANSLATION MEMORY

As shown in FIG. 33 for step 1 of the program memory, the OP code 01110 is supplied, as discussed previously, during clock phase 1 via MIR register 1401, leads MI10 through MI15, to translator memory 501, FIG. 5, thereby directing the translator memory to supply, over the output leads 1–24, FIG. 6, the bits contained at location 30 therein. These bits are supplied to translator control circuit 701, FIG. 7, to control the machine functions in the manner now to be described.

It should be noted that certain bits of the translator memory word, namely, bits 3, 4, 6, 7, 8, and 10 are negative logic bits and are thus shown with a bar over the bit number. Negative logic in this case indicates that a 0 in memory is the controlling state while a 1 in the memory represents the inactive state. All of the other bits of the memory are positive logic bits where a 0 represents the inactive state and a 1 represents the active or controlling state. The reason for reversing certain of these bits is to preserve positive control of the processor, even when the translator memory is disabled. Since the use of negative logic bits is a design option only, a machine using the principles of our invention can be constructed using only positive logic bits if it is so desired.

Turning now to FIG. 5, the first and 17th bits of the 30th word are used to control the read-write control of the program and are only used for this purpose and thus these bits will be ignored from this point on in the specification with the understanding that when it is desired to communicate an instruction from the program memory to the source bus or from the destination bus to the program memory, the translator memory location containing these bits is addressed. The 0, or low signal, in bit position 2 is extended to FIG. 7, translator control 701, lead SE and over cable 720 to FIG. 14, and to the select input to AR gate 1406.

Figure 15:
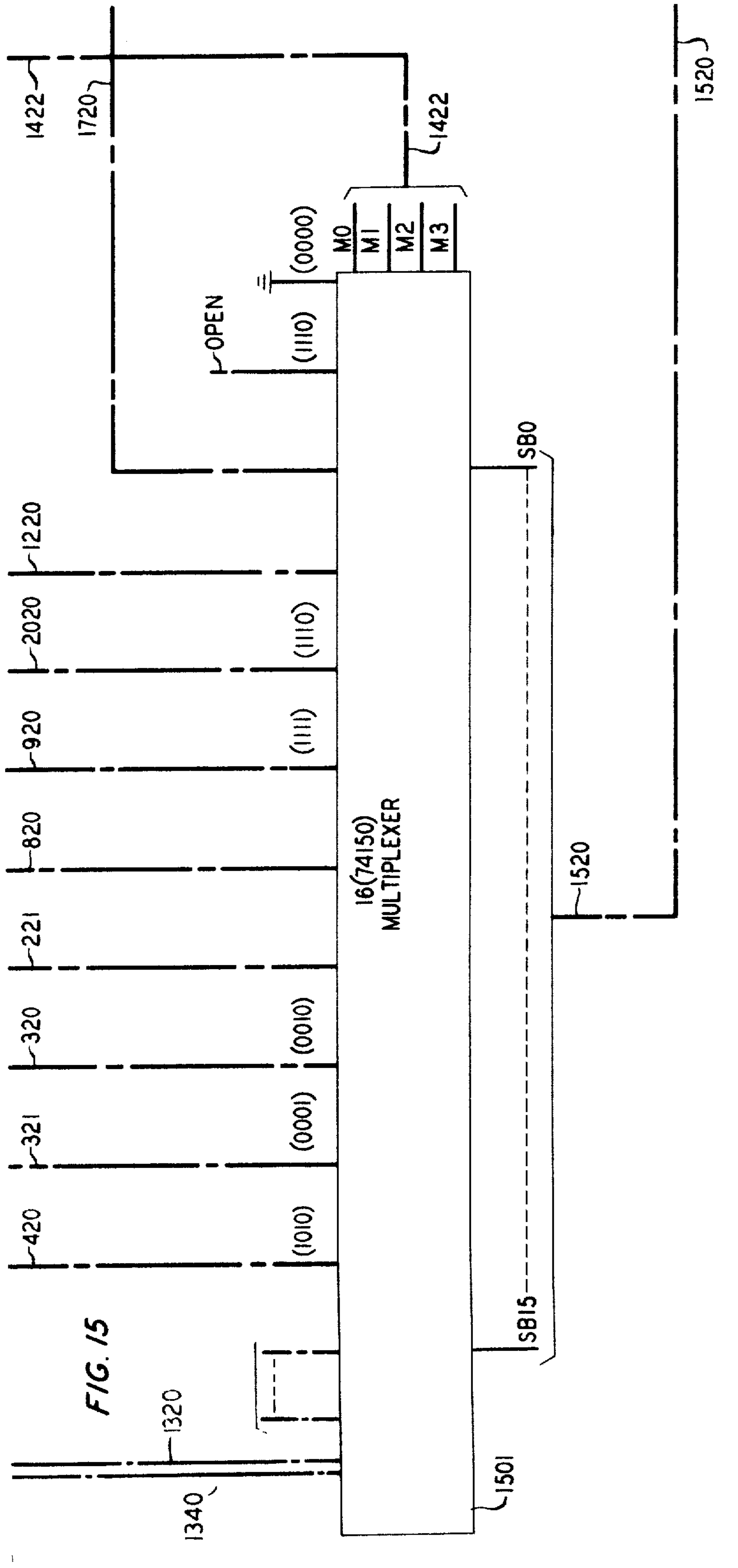

Since the SE lead is low, the A input to AR gate 1406 is selected and thus leads MI0 through MI3 (bits 1 through 4 from program memory step 1) are extended through AR gate 1406 and over leads M0 through M3 and cable 1422 to FIG. 15 to the input of multiplexer 1501. Since the information on leads M0 through M3 is the information stored in MIR register 1401 which information is the same as bits 1, 2, 3, and 4 obtained from the program memory, step 1, the binary word on leads M0 through M3 at this time (as shown in FIG. 33) is 0010.

Multiplexer 1501 consists of 16 separate multiplexer chips each having 16 inputs and each functioning in a manner to connect a selected one of the inputs to the output lead. For example, upon receipt of the binary code 0010 each of the multiplexers is arranged to connect an individual one of the 16 leads of cable 320 to an individual one of the output leads SB0 through SB15. Accordingly cable 320, which as will be seen consists of leads F0 through F15 from FLAG register 304, is connected at this time to leads SB0 through SB15 so that information on lead F0 is transferred to lead SB0 and information on lead S15 is transferred to lead SB15. Leads SB0 and SB15 comprise cable 1520 which cable is the source bus.

Figure 3:
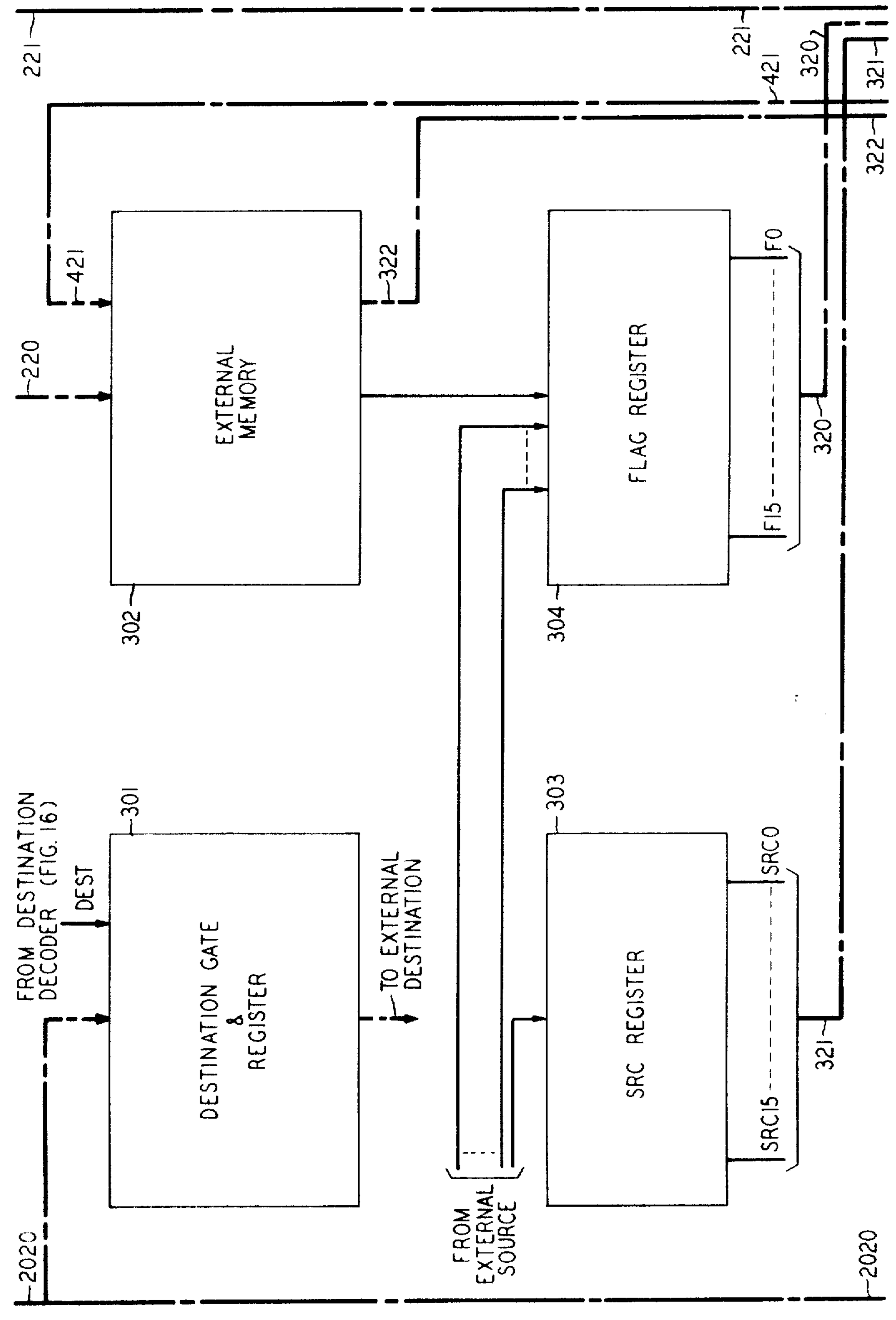

Cable 320 extends from FIG. 15, multiplexer 1501, to FLAG register 304, FIG. 3, and each of the F- leads is associated with a particular one of the registers (not shown) contained therein. These registers are individually controllable from external sources such that whenever information is available for communication to the source bus from any external source, such as from external memory 302 or from SRC register 303, a particular one of the FLAG registers becomes set and the associated F- lead contains a 1.

We shall assume that upon information being stored in SRC register 303 the F14 lead in FLAG register 304 goes high. We shall further assume at this point that the SRC register 303 has not been activated and thus lead F14 is low at this point. The status of each of the other F- leads of the FLAG register is not important since the program being executed calls for a left rotation of 15 places. Thus, the F14 lead will appear, as will be discussed, on lead A0 of the ACC, and the machine, under control of the translator memory, will compare only the A0 lead to zero.

Continuing now in FIG. 5, bit 3 of word 30 is a negative logic 1 and thus of no importance at this time. The low in bit position 4 is provided over lead 4 to translator control 701, FIG. 7, and extended over lead RE of cable 720 to FIG. 14 to address gate 1404 and to the enable input of AR driver 1405. Since the select input of AR driver 1405 is now low, information is passed through the AR driver 1405 from leads MI8 to MI11 which leads have been extended from MIR register 1401. It will be recalled that the information currently stored in MIR register 1401 is information obtained from step 1 of program memory 1301. Thus leads MI8 through MI11 contain the word 1000 with lead MI8 having a low thereon and lead MI11 having the high or 1. This information is communicated via cable 1421 to rotate circuit 1801 shown in FIGS. 18, 19, 22, and 23.

Figure 18:
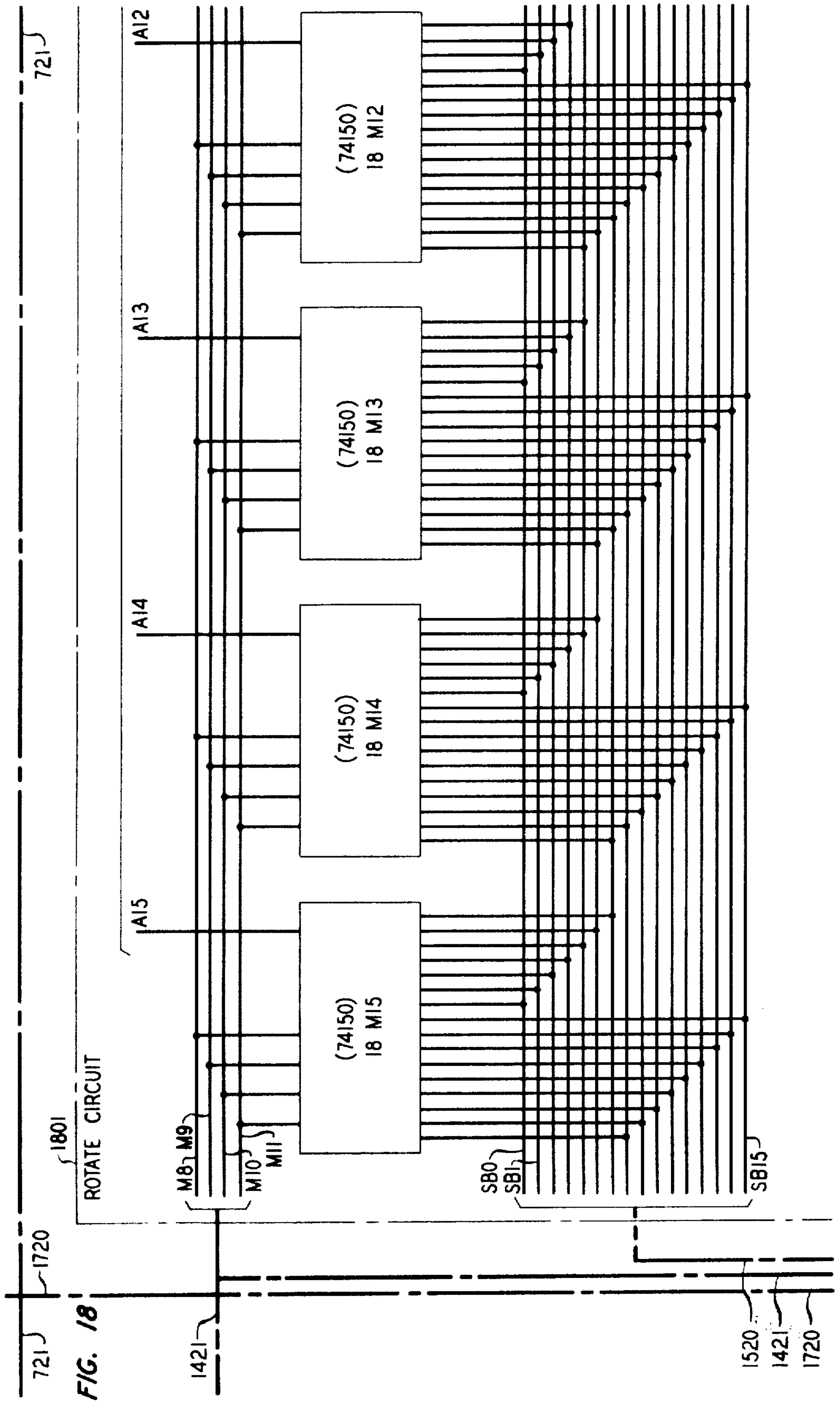
Figure 19:
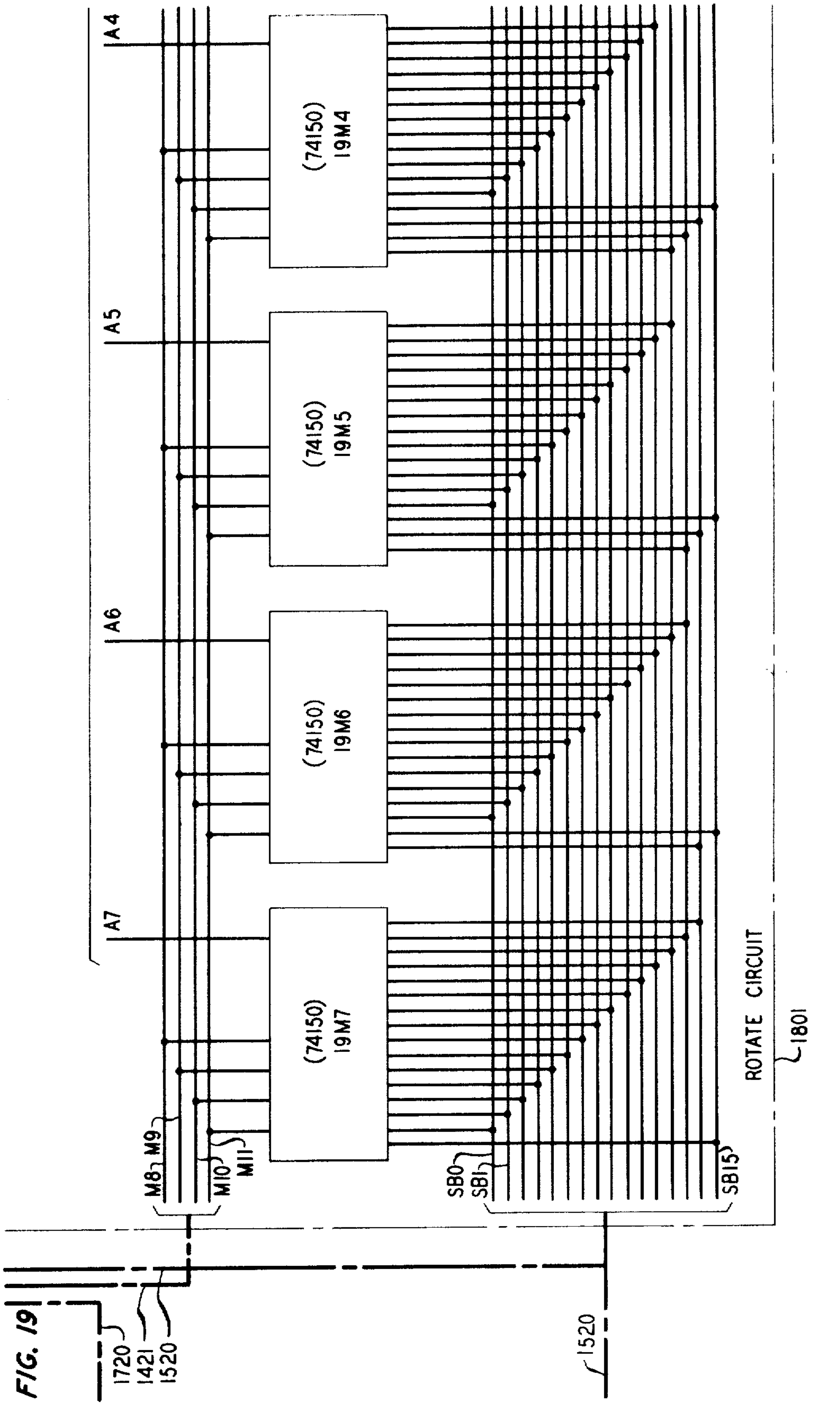

The binary word 1000 applied to the input of the rotate circuit causes that circuit to transfer information fifteen places to the left. The precise manner in which this is accomplished is well known in the art and, briefly stated, is accomplished by utilizing a plurality of multiplex selectors, such as 18M12, 18M13, 18M14, 18M15, 19M4, 19M5, 19M6, 19M7, 22M8, 22M9, 22M10, 22M11, 23M0, 23M1, 23M2, and 23M3. As an example, when the binary word 1000 is applied to the control inputs of the multiplex selectors, each selector operates to allow one input to be provided to its output. In this case under control of word 1000, input 17 is connected through each selector. Accordingly, as shown in FIGS. 19 and 20, lead SB14 is extended through selector 23M0 to lead A0. Thus lead SB14 is rotated 15 positions and the information thereon now appears on lead A0, which information on lead A1 corresponds to information from lead SB15. Information on lead A2 corresponds to information from lead SB0; information on lead A3 corresponds to information from SB1 and so forth until, as shown in FIG. 18, lead A15 as controlled by selector 18M15 is connected to lead SB13. The outputs of the selector leads A0 to A15 are provided over cable 2220 to FIG. 21 and form the input to arithmetic logic unit (ALU) 2101.

Figure 7:
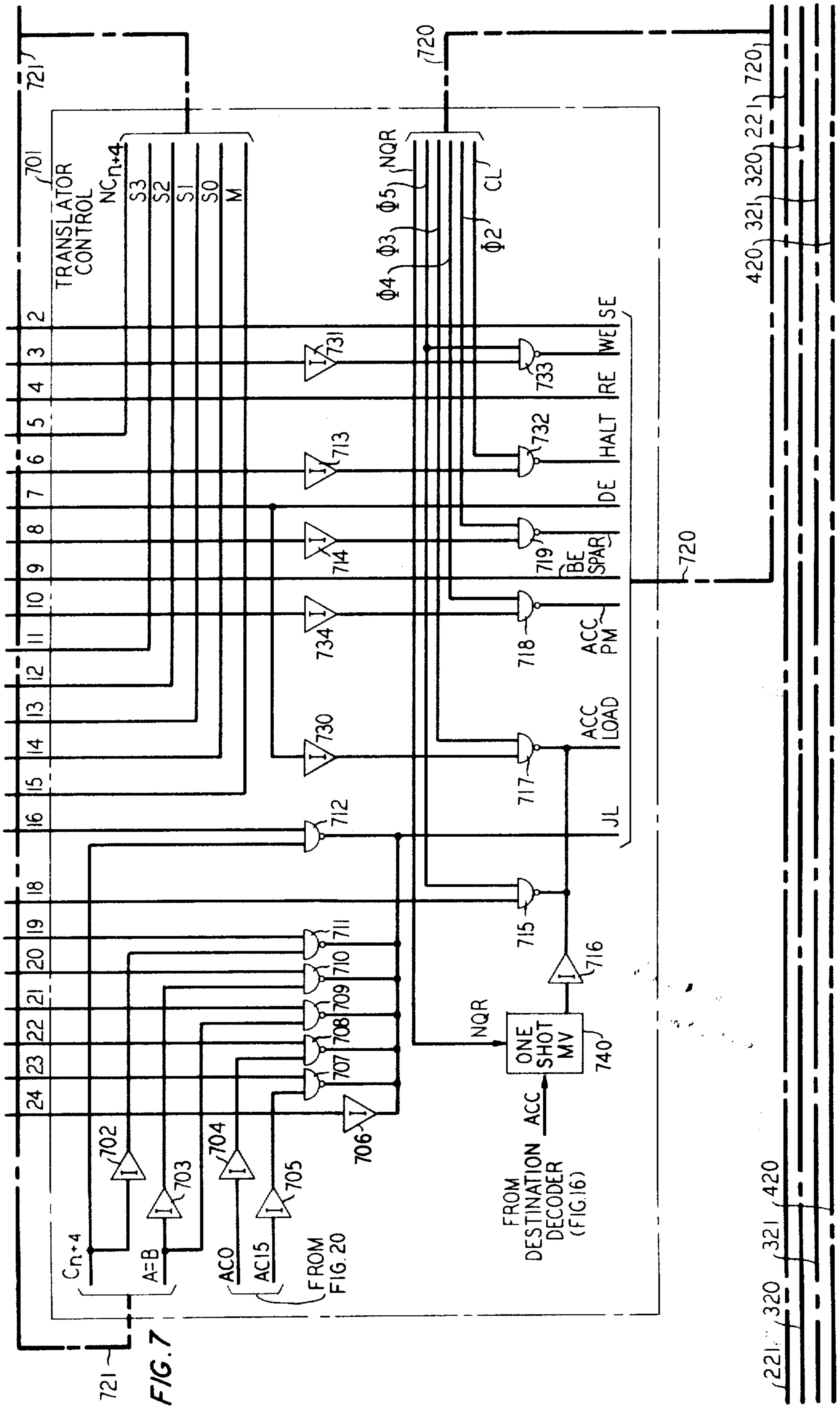

Returning now to FIG. 5, translator word 30 bit 5 contains a 1 which is communicated over lead 5 to FIG. 7 and extended from FIG. 7 on lead $NC_n+4$. This lead, in conjunction with leads S0–S3 and lead M, is used to control the arithmetic logic unit directly without first decoding. Since the translator memory bits controlling leads S0–S3 and M are bits 11–15 and are all zero and $NC_n+4$ is 1 at location 30, the ALU transfers the information directly through to the ALU outputs and to the accumulator over cables 2120, 2121, 2122, and 2123.

Selector registers 20SR0, 20SR1 of accumulator 2001 function to accept information only when lead ACC LOAD is low. Since the ACC LOAD lead is now high, as shown in FIG. 7, controlled by clock phase 3 or phase 5, the information from the ALU is not stored in the ACC at this time.

Returning again to FIG. 5, bit 6 of translator word 30 is a bit corresponding to the HALT condition and since it is negative logic and a 1 it is of no consequence. Bit 7, being negative logic and a 0, is an operative bit and controls the destination decoder enable. Thus, as shown in FIG. 7, a low transferred over lead 7 from the translator memory and over lead DE of cable 720 to FIG. 16 is extended to the 19 input of destination decoder 1601. Since lead Φ5 is low at this time, translator 1603 remains inoperative.

Continuing for a moment in FIG. 16, it should be noted that when the clock was started, lead NQR went low thereby causing DD gate 1602 to accept information from inputs MI4 through MI7 instead of from inputs DD1 through DD4. Thus, since leads MI4 to MI7 of cable 1420 have been extended from MIR register 1401, the binary word 1110 (bits 5–8 of program memory, step 1) is communicated to leads A, B, C and D of translator 1603.

Digressing momentarily, when binary word 1110 is decoded, a low word appears on lead ACC (when both inputs 18 and 19 of translator 1603 are low). However, that lead is not connected since the 1110 code is the code specifying the accumulator and since information transferred through the machine always ends up in accumulator registers 20SR1 and 20SR0 regardless of where else that information is to be distributed. In the situation where the ACC-stored information is to be communicated to a destination register, the code associated with the destination register is decoded by destination decoder 1601. Then, information is stored, both in the accumulator and in the selected destination register, under control of the decoded bits from the program memory. The reason for dedicating code 1110 to the accumulator, even though that code performs no function, is to prevent the unintentional transfer to some other register.

Returning now to FIG. 5, translator memory bits 1 through 15 of location 30 have all now been discussed and bits 16 through 24, being positive logic and all 0s, are of no consequence at this time.

Summarizing briefly, the program memory has been addressed at a selected location and the first microinstruction of a set of microinstructions has been obtained from the program memory and the OP code portion thereof transferred to a translator memory for selection of a particular word therein. The individual bits of the selected word have been used without decoding in a direct unpacked manner to control the machine functions in conjunction with phase 1 of a series of clock pulses.

Thus, under control of the translator memory, information from the FLAG register (with the address of the FLAG register being provided by the program memory) was transferred to source bus 1520 and provided to the rotate circuit. The translator memory caused the rotate circuit to rotate the information received on the source bus through 15 positions. The rotated information was then communicated to the ALU, and the ACC, under control of certain translator memory bits, communicated the received information directly therethrough to the input of the ACC without performing any function on the supplied information.

2.7 CLOCK PHASE 2

At the end of clock phase 1, lead Φ2 from clock control 1101, FIG. 11, goes high while lead Φ1 goes low. Accordingly, in phase 2 the low on lead NΦ2 is communicated via cable 720 to FIG. 12 causing the output of NAND gate 1216 to go high and the output of inverter 1217 to go low thereby incrementing by 1 the information contained in counter registers 1206, 1207, and 1208. These registers, it will be recalled, contained the address location of the first microinstruction of the program memory. Thus, during phase 2 the program memory register PMAR is updated to correspond to the next sequential address of the program memory. Thus, the new address information is supplied to program memory 1301, FIG. 13, and the output bits associated with the second microinstruction, as shown in FIG. 33, are supplied over leads MP0 through MP15 and cable 1320 to the input of instruction selector 1001, FIG. 10. Again since the OP code bits 10 through 15 are not all 1s (FIG. 33, step 2) the output of NAND gate 1007 remains high and the B input leads again are selected and again the microinstruction from the program memory is supplied over cable 1020 to FIG. 14 to the MIR register 1401. However, since lead Φ1 is low during phase 2 the clock input to MR latch 1402 and to MR latch 1403 is low and therefore at this time the output information on leads MIO through MI15 remains exactly as before and continues to supply the previous microinstruction obtained from the program memory.

2.8 CLOCK PHASE 3

Returning now to FIG. 7, when the clock enters phase 3 lead Φ3 goes high, thereby providing a high to one input of NAND gate 717, the other input to NAND gate 717 is from bit 7 of the translator memory, FIG. 5, and since bit 7, inverted, is 1 lead ACL LOAD goes low. The ACC loads on the positive transition at the end of phase 3.

It will be recalled that the output from ALU 2101 is 16 bits, which bits correspond to the bits supplied by FLAG register 304, FIG. 3. The information from FLAG register 304 has been rotated left 15 positions such that FLAG register bit F14 now corresponds to the output bit AC0 of accumulator 2001.

2.9 CLOCK PHASE 4

When the phase 4 lead goes high, one input of NAND gate 718 goes high while the other input, being an inverted 1 is low. Thus, the output of NAND gate 718 remains high and is of no effect.

2.10 CLOCK PHASE 5

Phase 5 has no further effect on the processor operation.

2.11 PROGRAM MEMORY STEP 2

At the completion of phase 4, phase 1 again occurs and a high again appears on lead Φ1 from clock control 1101, FIG. 11. This high is communicated to FIG. 14 such that input information provided from microinstructions 2 of the program memory via leads MIR0 through MIR15 in the manner previously described is extended through MR latch 1402 and MR latch 1403, and over leads MI0 through MI15. The OP code bits, which for step 2 are 110010 and which appear on leads MI10 through MI15 of MIR register 1401, are extended over cable 1420 to FIG. 5 to translator memory 501 thereby addressing step 50 as shown in FIG. 6.

Figure 30:
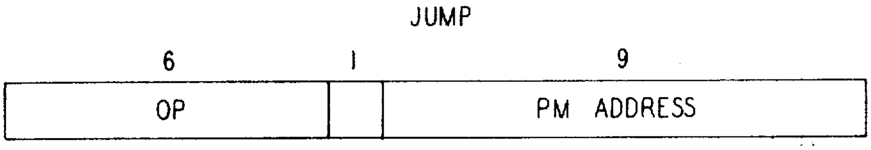

Bits 1 through 21 of translator memory 501 word 50 are ineffective at this time, since these bits are effectively 0, since the bits which contain 1s are negative logic bits as discussed previously. Bit 22 of translator memory 501 word 50 is a jump instruction bit with a condition that the jump will only occur only if A0 equals 0. Thus the 1 in bit position 22 is transferred over lead 22 to FIG. 7 to one input of NAND gate 708. The other input of NAND gate 708 comes from inverter 704 the input of which is bit A0 from the accumulator 2001. Since we have assumed that the A0 bit is 0, lead A0 is low which is inverted by inverter 704 thereby making both inputs to NAND gate 708 high. Accordingly, a low is extended over lead JL cable 720 to FIG. 12 to the input of inverter 1209 thereby causing a high to be placed on the select lead of PM gates 1203, 1204, 1205 of PMAR gate 1201. Accordingly, PM gates 1203, 1204, 1205 accept information from the B inputs through leads MI0 through MI8 from cable 1420 which bits have been extended from FIG. 14 leads MI0 through MI8 of MIR register 1401. Since these bits represent the first nine bits of program memory 1301, as shown in FIG. 33, the information communicated to the PMAR gate 1201 at this time is 000000001. Thus counter registers 1206, 1207, and 1208 are supplied with the address location bits, of the information contained in program memory step 2. FIG. 30 shows the format of this type of jump instruction.

It should be recalled that had the counter registers not been loaded from the PM gates at this time, the address location contained therein would be incremented during clock phase 2 to the address location sequentially next to the last-used address location, which in the example would have been address location 3 of program memory 1301. Continuing now in FIG. 12, when lead JL went low one input to NAND gate 1211 went high. The other input to NAND gate 1211 is controlled by lead 0 and is also high. Thus the output of inverter 1213 is low causing PMAR register 1202 to accept the output of PMAR gate 1201, which is the address bits specifying location 1 of the program memory.

Accordingly, as long as bit F14 of FLAG register 304, FIG. 3, contains a 0, the program memory will continue to cycle between steps 1 and 2 in the manner just described. This cycling will continue until some external control instruction is communicated to the machine to change the routine.

2.12 EXTERNAL INFORMATION AVAILABLE

Assume now that FLAG register F14 contains a 1 representative of the fact that information has been supplied to SRC register 303, that 1 will be communicated to accumulator 2001, bit position AC0 in the manner described previously under control of program memory step 1 and word 30 of the translator memory. When the translator memory is directed to step 50 under control of program memory step 2 the 1 in bit position AC0 is communicated to NAND gate 708, FIG. 7, as discussed previously. Since the A0 lead is now high, the output of NAND gate 708 remains high thus keeping lead JL high, which high is communicated via cable 720 to FIG. 12; accordingly, a low is impressed on the select inputs to PM gates 1203, 1204, and 1205 of PMAR gate 1201. The high on lead JL causes a low to be supplied to one input of NAND gate 1211 making one input of NAND gate 1212 high. The ACC PM lead is also high because as shown in FIG. 7, at least one input of NAND gate 718 is low. Lead NQR is low and since all these inputs of NAND gate 1212 are high, the output is low causing the output of inverter 1213 to be high. Thus, counter register 1206, 1207, and 1208 of PMAR register 1202 cannot be loaded from information supplied from PM gates 1203, 1204, 1205.

Figure 12:
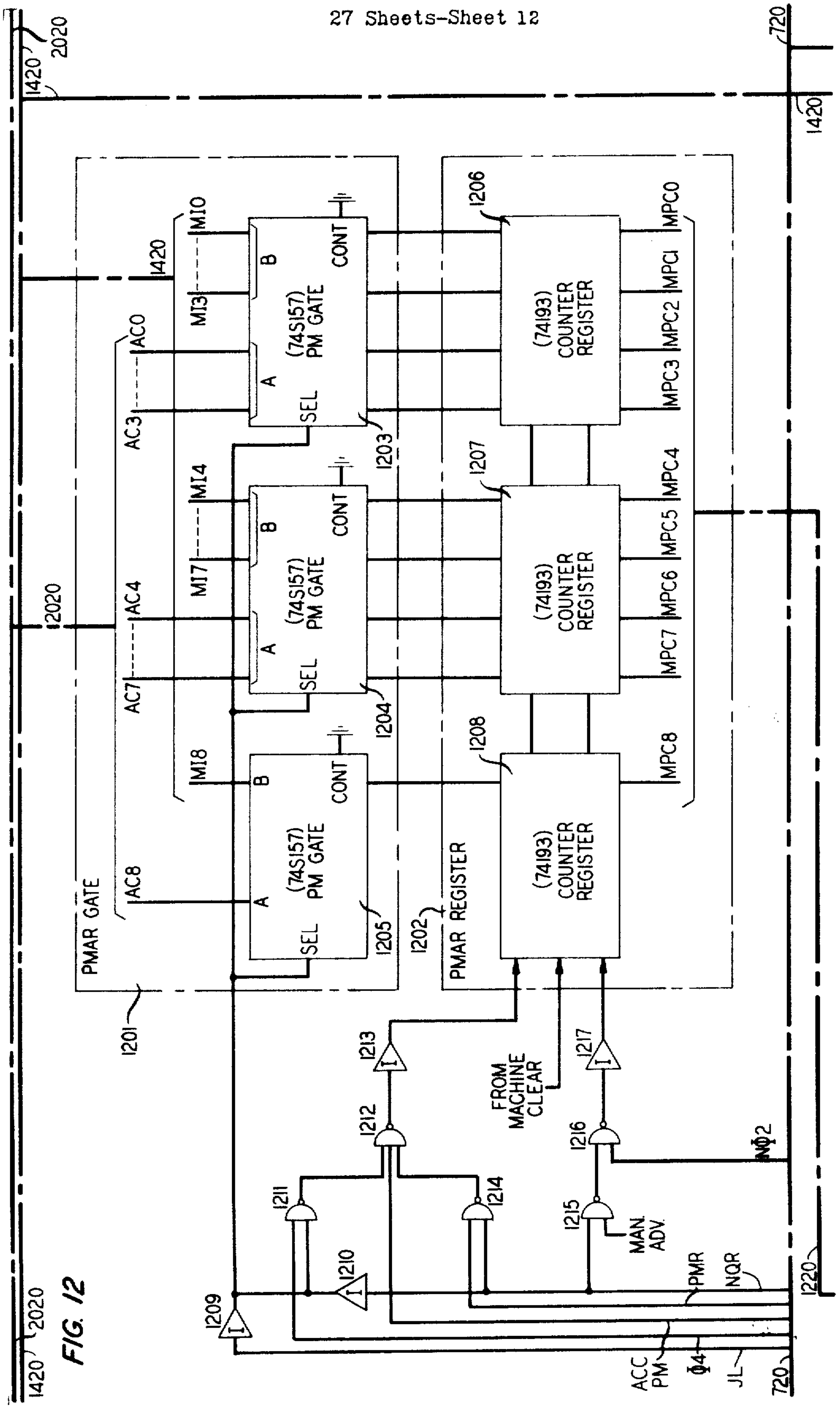

Accordingly, when the clock control circuit FIG. 11 enters phase 2 the NΦ2 lead is low which low is communicated via cable 720 to FIG. 12 to one input of NAND gate 1216 causing the output thereof to be high and the output of inverter 1217 to go low. Thus, during clock phase 2, PMAR register 1202 increments by one the address location contained in counter registers 1206, 1207, 1208.

Since the address location contained in PMAR register 1202 prior to being incremented was the address location of program memory 1301 step 2, the PMAR register after incrementation contains the address location of step 3. Accordingly, when the FLAG register bit F14 is rotated and communicated to the accumulator, FIG. 20, to position A0 and when this bit is greater than zero, the program memory is allowed to sequence to the next address instruction which in this case is step 3. As shown in FIG. 33 step 3 is an instruction which calls for the transfer of information from the SRC register to the accumulator in a one-to-one manner without rotation.

Figure 25:
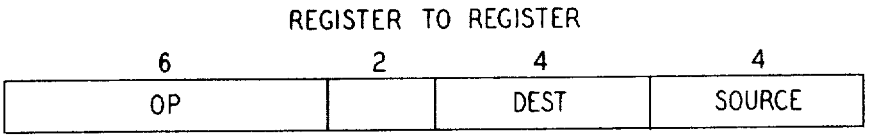
FIG. 25 through FIG. 30 show the microinstruction word formats for the various microinstructions obtained from the program memory.
Figure 26:
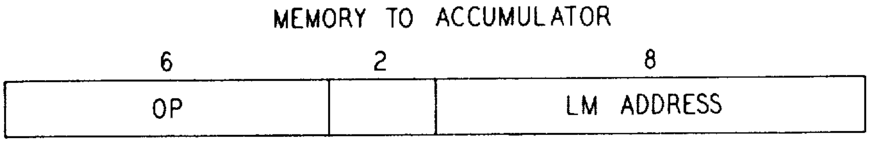

Since step 3 is a register-to-register instruction the form of the instruction in the program memory is as shown in FIG. 25, with the first four bits being source bits, the second four bits destination bits, and the last (leftmost) six bits OP code bits. Thus, the instruction bits contained in program memory 1301 at the address location of step 3 are communicated, in the manner previously described, through instruction selector 1001 FIG. 10 to MIR register 1401 when the clock again arrives at the first phase. Thus at the next phase 1 leads MI0 through MI15 of MIR register 1401 contain the information shown for step 3, FIG. 33. Accordingly, the first four bits supply the word 0001 which bits are communicated to address gate 1404 to the A input of AR gate 1406. Assuming lead SE to be low at this point leads M0 through M3 of AR gate 1406 contain the word 0001 which bits are communicated via cable 1422 to FIG. 15 to multiplexer 1501 thereby connecting the leads of cable 321 through the multiplexer to the corresponding SB0 through SB15 leads of cable 1520. This information is then supplied to the input of rotate circuit 1801, FIGS. 18, 19, 22, and 23.

Concurrently, the OP code bits of step 3 from the program memory are extended via leads MI10 through MI15 from MIR register 1401 to the address select input of translator memory 501, FIG. 5 and, as shown in FIG. 33, the OP code associated with step 3 is 000000. Thus, specifying the zero instruction which is a register-to-register instruction with no logical operation in the ALU.

2.13 TRANSLATOR MEMORY CONTROL OF STEP 3

Continuing in FIG. 5 with word zero, bit 2 is utilized via FIG. 7 to communicate a low over lead SE of cable 720 to FIG. 14 to control AR gate 1406 in the manner previously described. Bit 3 is a negative logic bit and of no consequence. Bit 4 is a negative logic 1, which 1 is communicated to FIG. 7 as a high and extended over lead RE, cable 720 to FIG. 14 to AR driver 1405 of address gate 1404 thereby causing AR driver 1405 to be disabled, causing the AR driver outputs to go high. Since the AR driver outputs are high, 1s or highs are communicated to leads M8 through M11 which highs are extended over cable 1421 to FIGS. 18, 19, 22, and 23 to control rotate circuit 1801 in a manner preventing that circuit from rotating the information received. Thus, bits 1111 on leads M8–M11 correspond to zero rotation and information supplied on lead SB0 to the rotate circuit is extended therethrough to lead A0 of cable 2220 to ALU 2101, FIG. 21. Information extended to the rotate circuit over any of the other leads SB1 through SB15 is communicated through the rotate circuit on a one-for-one basis to the corresponding A1 through A15 lead of cable 2220 to ALU 2101.

Summarizing briefly at this point, step 3 from program memory 1301 has been enabled upon the detection of a 1 in FLAG register bit position F14 associated with SRC register 303. The OP code portion of step 3 of the program memory has been communicated to the translator 501 as an address location therein, and the individual bits of the selected word in the translator memory have been used to enable multiplexer 1501 to extend information contained in the SRC register to the rotate circuit. The particular register selected by the multiplexer has been determined by the first four bits of the word contained in step 3 of program memory 1301. The rotate circuit has been enabled in a manner controlled by a certain bit of the selected translator memory word to allow information to pass through the rotate circuit directly without rotation, which information has been extended to the arithmetic logic unit 2101, FIG. 21. Other bits of the selected translator memory word controlled ALU 2101 in a manner allowing information communicated thereto to be extended to accumulator 2001, which information when the clock control arrives at phase 3 will be accepted by gates 20SR0 and 20SR1 and communicated to the accumulator registers 20SM0 through 20SM3 under control of the ACC LOAD lead from cable 720 going from low to high.

It should be noted at this point that the information from the ALU unit was passed to the accumulator for storage therein under control of the translator memory without specific direction from the program memory. This is the typical operation of the machine and is arranged such that at the completion of all arithmetic logic operations the result appears in the accumulator 2001. Had it been desired to also communicate the information from the accumulator to any other destination register the second four bits of the program memory would have contained the bits corresponding to the desired destination. These bits would have been communicated, as discussed previously, to DD gate 1602 FIG. 16 and via that gate to destination decoder 1601 and during phase 5 of the clock would have caused translator 1603 to provide a low on the output associated with the desired destination register. Accordingly the input gates of the desired destination register would be enabled such that information supplied from the output of the accumulator on destination bus 2020 would be communicated to the desired register.

2.14 PROGRAM MEMORY STEP 4

Turning now to FIG. 12 during the second clock phase of step 3, lead NΦ2 goes low making the output of gate 1216 high and the output of inverter 1217 low thereby again increasing the value of the bits contained in counter register 1206, 1207, and 1208 by 1. Thus the address location now contained in PMAR register 1202 corresponds to the address location of step 4 of program memory 1301 thereby causing the bits shown in FIG. 33 step 4 to be communicated, in the manner previously described, to the input of MIR register 1401.

When the clock control again reenters phase 1 the output of MIR register 1401 contains the bits associated with program memory step 4, the OP code portion of which is 101101. This OP code corresponds to address location 45 in translator memory 501, FIG. 6.

Figure 29:
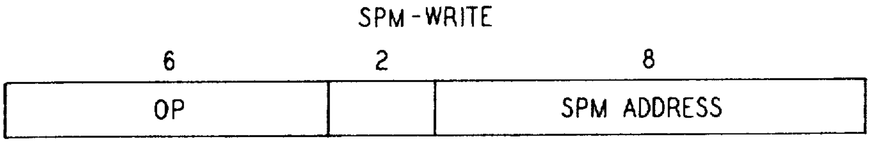

Under control of the bits obtained from word 45 of translator memory 501 the information presently contained in accumulator 2001, which information it will be recalled is the information received from SRC register 303, is transferred to scratch pad memory SPM 901 via destination bus 2020 at the address location therein supplied by the program memory step 4, bits 1–8. The form of this microinstruction is shown in FIG. 29.

The manner in which this transfer of information occurs will now be described. Bit 2 from translator memory 501 word 45 contains a 1, which 1 or high is communicated over lead 2 to FIG. 7 translator control 701 and over lead SE to FIG. 14 address register 1404 thereby selecting the B input of AR gate 1406. Since the B input of AR gate 1406 is open, the output leads M0 through M3 are all high, which highs are communicated over cable 1422 to FIG. 15 to multiplexer 1501 thereby causing multiplexer 1501 to accept information from cable 920 in a manner previously described. Cable 920 is extended from FIG. 9 and contains information obtained from scratch pad memory SPM 901. For purposes of the program step now being executed this information is of no concern at this time.

Returning now to FIG. 6, the third bit of the translator memory word 45 is a 0, which 0 is communicated over lead 3 to FIG. 7, inverted by inverter 731 and supplied to one input of NAND gate 733. The other input of NAND gate 733 is high and this lead WE remains high.

Figure 8:
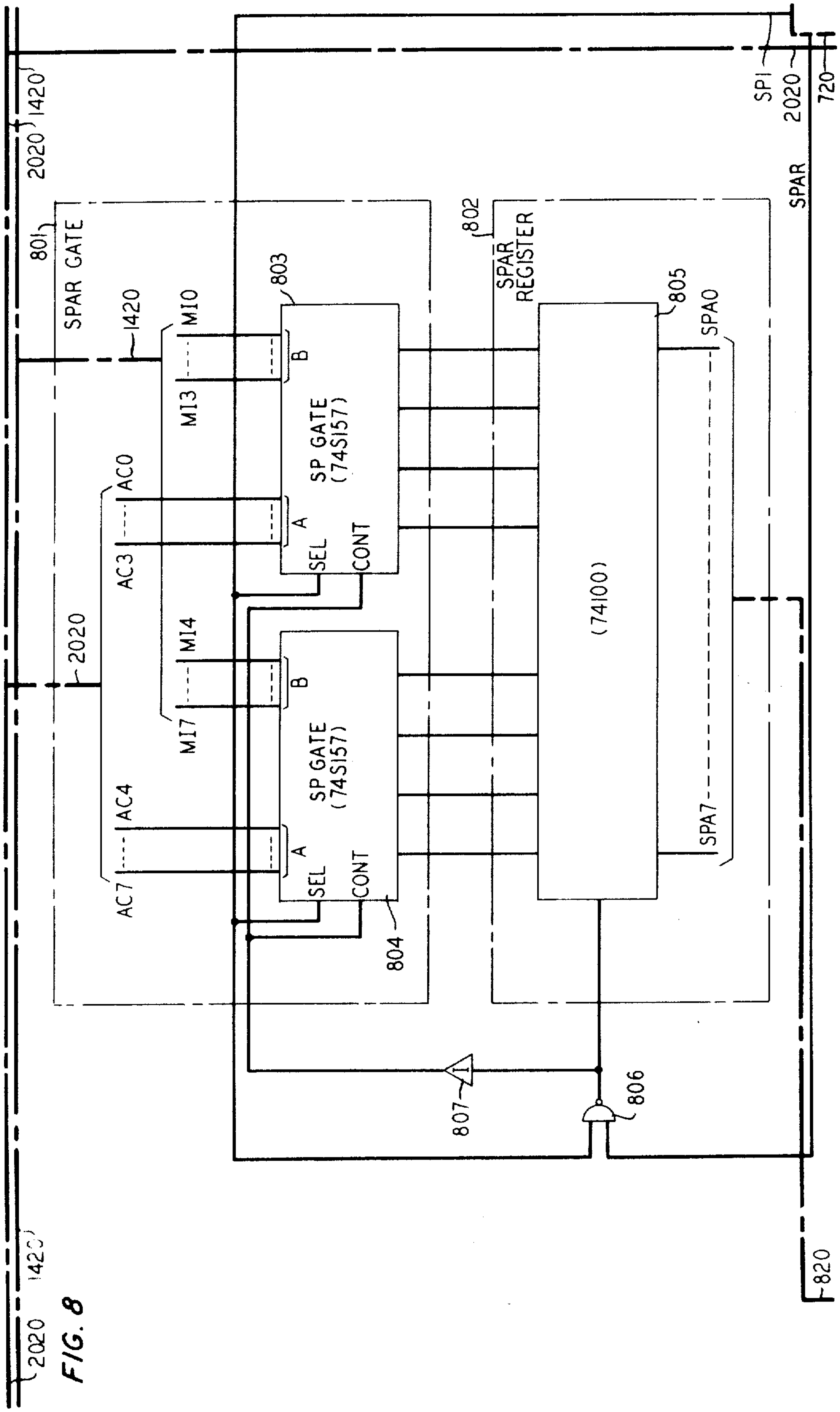
Figure 9:
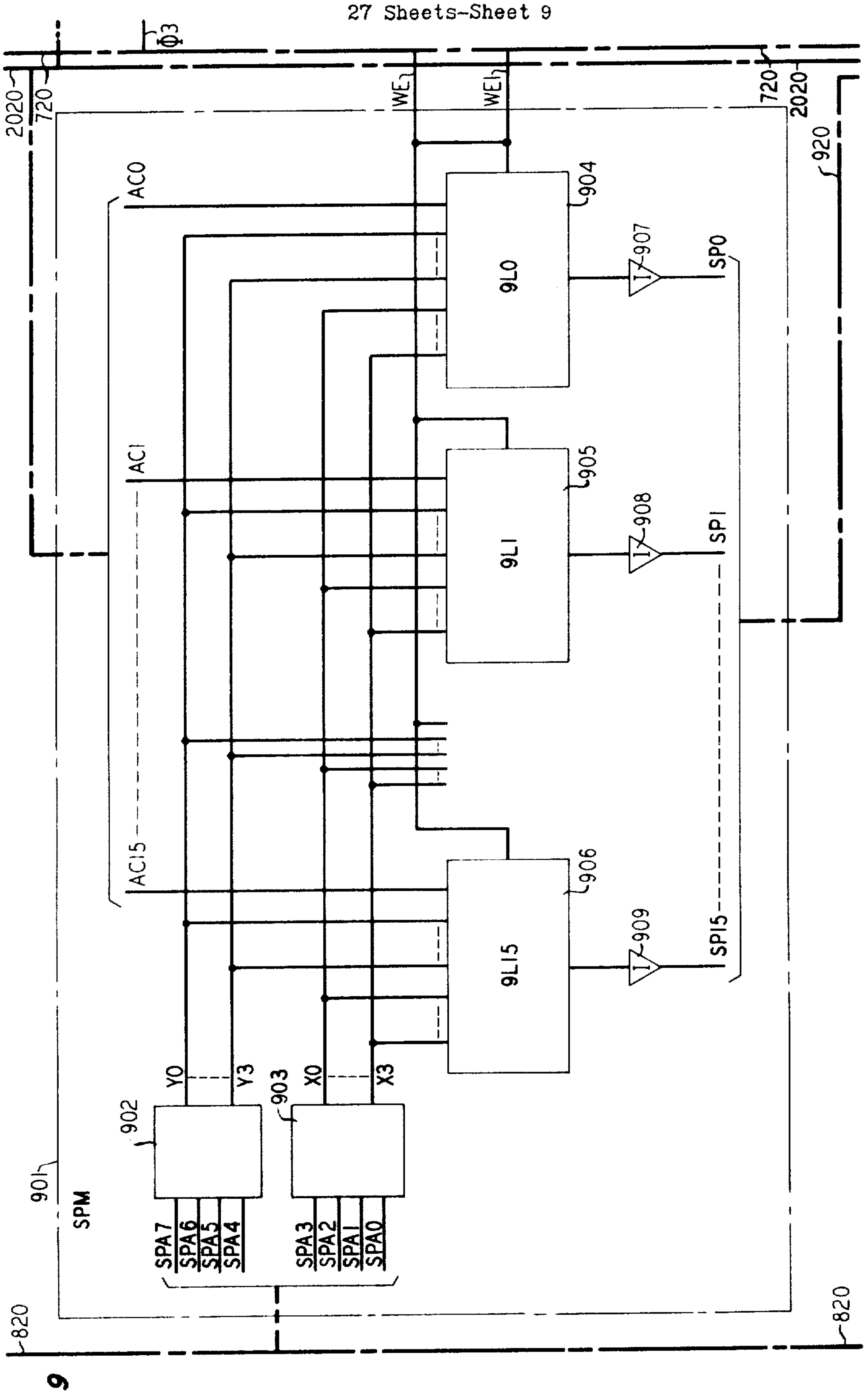
Figure 10:
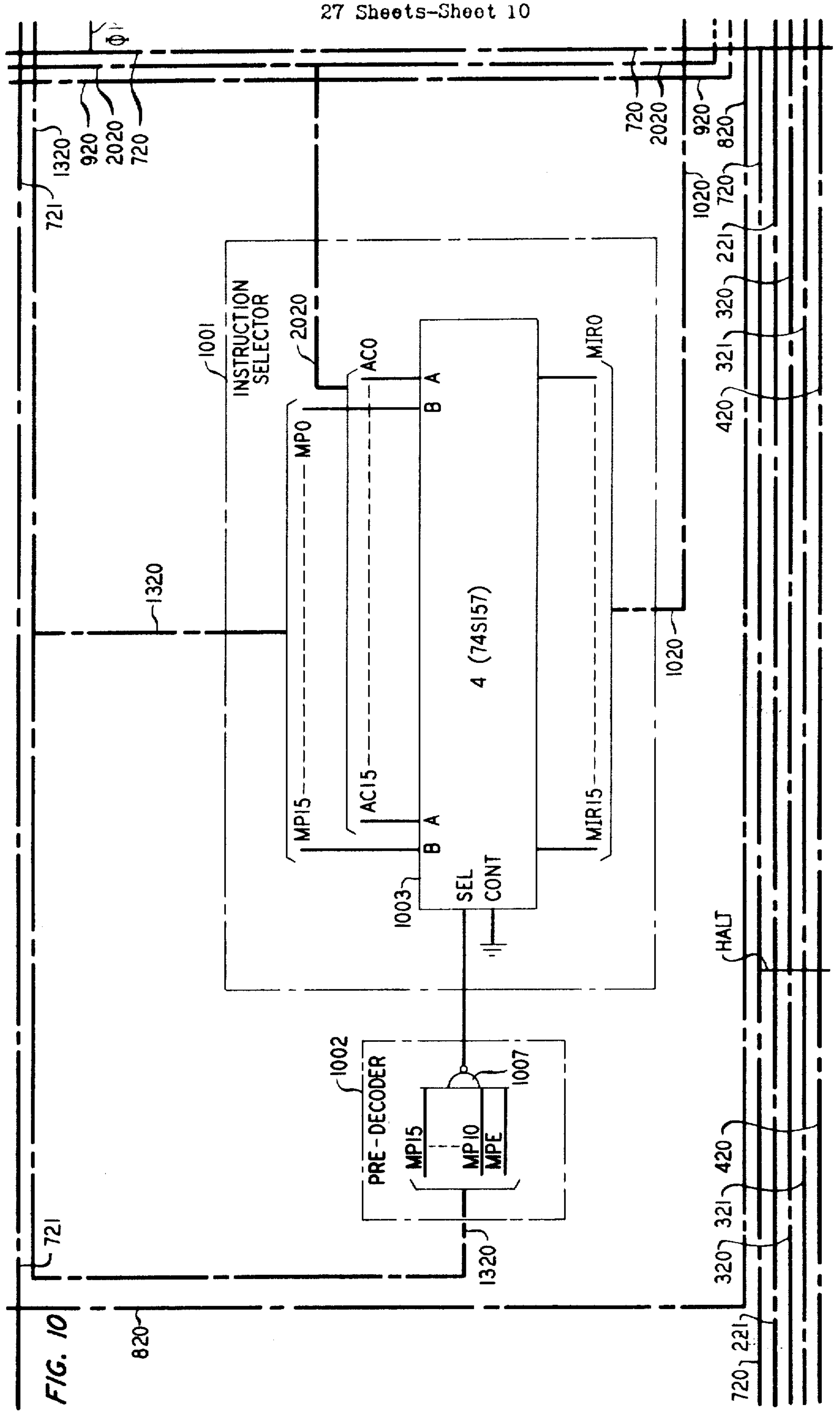

Turning to FIG. 8, access information is supplied to the SPAR gate 801 via cable 1420 from FIG. 14, the leads of which cable represent the bits on leads MI0 through MI7 and as shown in FIG. 33 step 4 are all 0s. Thus eight 0s are provided to SPAR register 802, which 0s are provided over leads SPA0 through SPA7 and cable 820 to FIG. 9 to the address control inputs of scratch pad memory (SPM), 901.

The SPM 901 is arranged in any one of the well-known circuit configurations operable upon receipt of addressing information and a write-enable pulse on lead WE to store, at the selected address, information received over leads ACO through AC15. Thus as shown in FIG. 7, when the clock arrives at phase 5, the output of gate 733 goes low thereby providing a low on lead WE, cable 720 to FIG. 9 thereby enabling the scratch pad memory 901 to write at the selected address location therein which in this case is address location 00000000. The information written into memory at the selected address is the information currently in the accumulator via leads AC0–AC15, which information, it will be recalled, is the information previously received from SRC register 303.

2.15 PROGRAM MEMORY STEP 5

At the next phase 1 of the clock, the OP code portion of step 5 of the program memory is communicated to the translator memory 501 in the manner previously described. As shown in FIG. 33 the OP code for step 5 is the same OP code for step 1 and thus in the manner previously described the bit at position F14 of FLAG register 304, FIG. 3 is rotated 15 positions and communicated to accumulator 2001 (FIG. 20) position A0.

2.16 PROGRAM MEMORY STEP 6

Step 6 is a jump instruction step and if the bit in position A0 of accumulator 2001 is 0 (signifying that the second digit to be stored has not been received by register SRC) the program memory is jumped back to step 5 under control of the first nine bits of the program memory step 6. Thus steps 5 and 6 are continuously repeated until such time as the A0 bit in accumulator 2001 becomes 1.

2.17 PROGRAM MEMORY STEP 7

When a 1 is received in accumulator position A0 the program memory advances to step 7 which step is the same as step 3, thereby allowing the information now received by SRC register 303 to be communicated to accumulator 2001.

2.18 PROGRAM MEMORY STEP 8

In step 8, as shown in FIG. 33, the information in the accumulator is transferred to the scratch pad memory position 1 under control of the first eight bits 00000001 of step 8.

2.19 PROGRAM MEMORY STEPS

At step 9, 0s are returned to the external source as an indication that both digits have been received. The manner in which this is accomplished will now be discussed.

The OP code portion of step 9 contains all 0s, thus addressing the zero instruction of translator memory 501, FIG. 5. Since, as shown in FIG. 33, the first four digits of step 9 are 0000 these 0s are transmitted, in the manner previously described, via MIR register 1401, FIG. 14, and leads MI0 through MI3 to AR gate 1406 and over leads MO through M3 to FIG. 15 to control the multiplexer input associated with 0000. As shown in FIG. 15 the 0000 input of multiplexer 1501 is connected directly to ground thus providing lows on all leads SB0 through SB15. Since the OP code, as translated, does not provide for rotation by the rotate circuit 1801 or arithmetic operations by the arithmetic logic unit 2101, 0s are provided directly to accumulator 2001 on all leads AC0 through AC15 all in the manner described previously.

As shown in FIG. 33 at step 9, the bits 5, 6, 7, and 8 contain the binary code 0001 which bits are communicated in the manner previously described to FIG. 16 and through the A input of DD gate 1602 via leads MI4 through MI7 from MIR register 1401 FIG. 14. Accordingly, the inputs A, B, C, and D of destination decoder 1601 address the translator 1603 in a manner to provide a low on the DEST lead under control of inputs 18 and 19 of the translator. Translator 1603 operates as discussed previously when both inputs 18 and 19 are low (i.e., in phase 5) to provide an output on the lead corresponding to the information on leads A, B, C, and D.

Since lead DE from cable 720 is low at this point, when the clock enters phase 5, Φ5 lead of cable 720 goes high thus making both inputs to gate 1605 high thereby making input 18 to translator 1603 low. Accordingly, in phase 5 a ground is provided over the DEST lead to FIG. 3 thereby opening the destination gate 301 allowing that set to accept information from the destination bus 2020 and leads AC0 through AC15 (not shown) thereof. Thus, at this point all 0s are returned to the external destination as an indication that two numbers have been received and that the machine is now prepared to perform a mathematical operation with respect to the received numbers; the particular operation to be communicated to the machine from some external source, such as from external memory 302.

2.20 COMMUNICATION WITH EXTERNAL MEMORY

Returning now to FIG. 33, when the program memory arrives at step 10 the OP code portion thereof directs translator memory 501, FIG. 5, to word 46 (FIG. 6) which word is an instruction for an unconditional jump to an address location specified by bits 1–9, as shown in FIG. 31, of the program memory. Thus, as shown in FIG. 6 for translator word 46, the 1 in bit position 24 is communicated to translator control 701 overlead 24, inverted by inverter 706 thereby providing a low on lead JL of cable 720. This low is communicated to FIG. 12 to the input of inverter 1209 causing the output thereof to go high. Thus, PM gates 1203, 1204, and 1205 now accept information from leads MI0 through MI8. At this time, since both inputs to NAND gate 1211 are high, one input to NAND gate 1212 is low, causing the output thereof to be high and the output of inverter 1213 to be low. Thus, counter registers 1206, 1207, and 1208 accept the information provided from PMAR gate 1201, which information corresponds to the information supplied by leads MI0 through MI8. Accordingly, bits 01010000 from step 10 of the program memory, as shown in FIG. 33 as bits 1 through 9, are now contained in PMAR register 1202 and the program memory is directed to step 80.

Continuing now in FIG. 33, the OP code portion 000000 of step 80 again directs the translator memory to the zero instruction thereof. Mulitiplexer 1501 is accordingly directed to establish a connection from inputs associated with bits 1010 (the first four bits of program memory step 80) and thus cable 420 (FIG. 15) is connected through multiplexer 1501 to source bus 1520.

Figure 4:
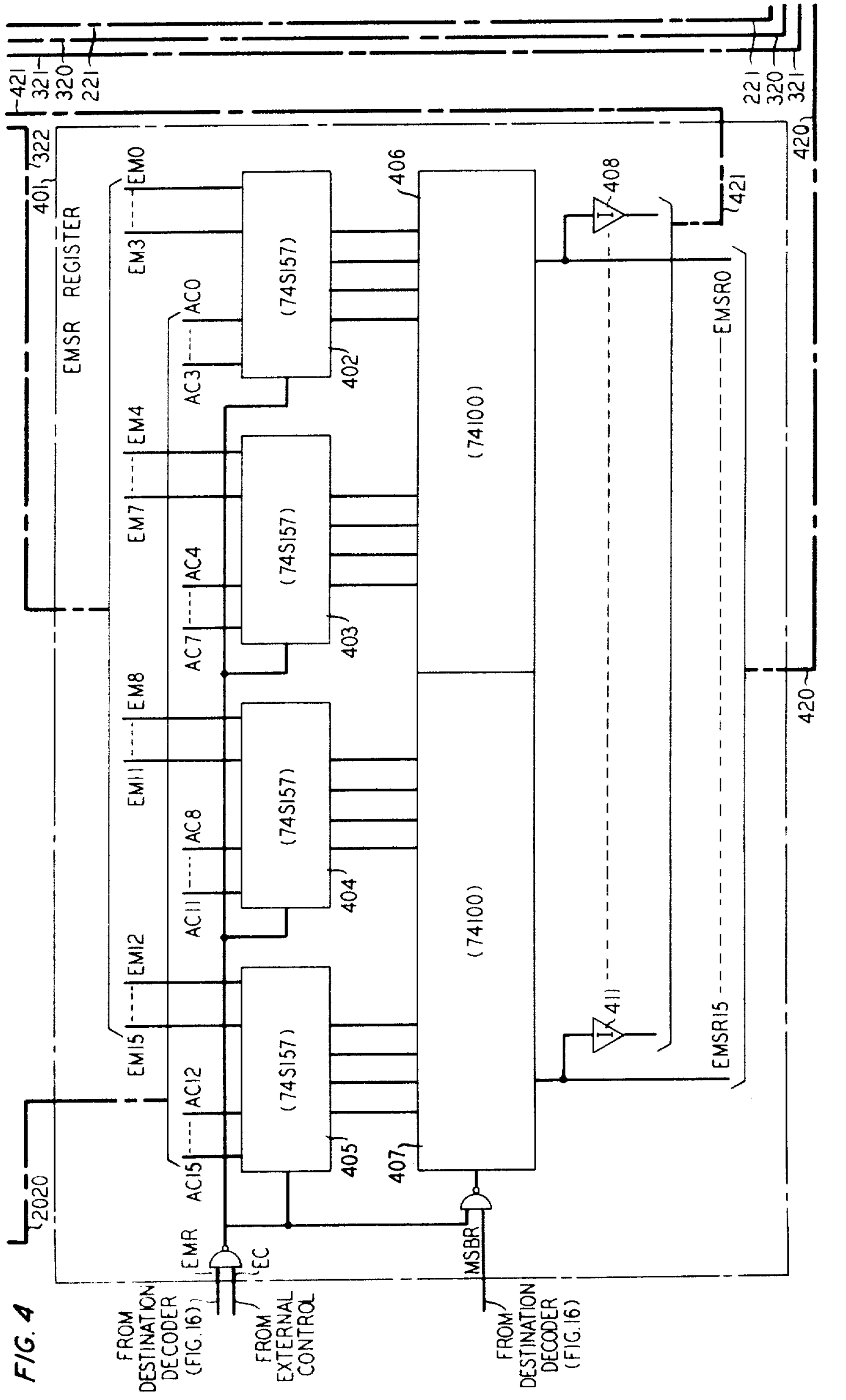

As shown in FIG. 4, cable 420 is an output from EMSR register 401. The input to EMSR register 401 is via cable 322 and leads EM0 through EM15 from external memory 302, FIG. 3. Thus, at this time a word is obtained from external memory 302 and communicated to accumulator 2001, FIG. 20, in the same manner as previously discussed for information transferal from any other source register connectable to source bus 1520.

It will be recalled at this point that the processor under control of its own program memory is awaiting instruction from the external memory for control purposes. However, since the processor is controlled only by its own program memory 1301, the only manner in which the external memory 302 can effect control of the processor is by directing the processor to a particular address location within program memory 1301. The actual functions performed by the processor then will combine to be controlled internally from microinstructions combined in the program memory at the selected address location.

For purposes of illustration, let us assume that steps 30 through 33 of program memory 1301 are steps controlling the addition of the two numbers previously received while steps 40 through 43 control the subtraction of the second number from the first number and steps 50 through 68 control the multiplication of those two numbers. At this point let us also assume that under control of the external memory, the processor is to be directed to perform the subtract function.

2.21 PROGRAM MEMORY STEPS 80 and 81

As shown in FIG. 33, step 80 is similar to step 1 except that the information transferred to the ACC from the FLAG register is not rotated. Thus, in step 81 when the A0 bit is compared to zero, a determination is actually being made as to whether the FLAG register bit F0 is a 1 or a 0. If it is a 0, the jump instruction is executed and step 80 is repeated.

When the A0 bit is greater than zero, the jump instruction is inhibited, as discussed previously, and the program memory is directed to step 82.

2.22 PROGRAM MEMORY 82 and 83

When the program memory advances to step 83 as a result of a 1 in the FLAG register bit associated with the external memory the translator memory is directed to its zero word, which word controls a register-to-register transfer. Accordingly, the register associated with bits 1010, which in this case is the source register EMSR 401, FIG. 4, serving the external memory, is connected via multiplexer 1501 to source bus 1520. The information provided by the external memory then is communicated to the ACC under control of the translator memory.

Continuing in FIG. 33, when the program memory advances to step 83, the OP code portion of that step 110111 directs the translator memory 501 to word 55. The form of the instruction is a register-to-register transfer with the source register being the accumulator and the destination register being the PMAR register. As shown in FIG. 33 for step 83, the first four bits 1110 are the bits dedicated to the accumulator and are of no effect since, as shown in multiplexer 1501 (FIG. 15), the 1110 input is open.

The destination bits 1100 are provided to destination decoder 1601 and thus provide a low to the input of inverter 1630, thereby providing a high on lead PMR of cable 720 to FIG. 12 and to one of the inputs of NAND gate 1214. The output of NAND gate 1214 goes low, making the output of NAND gate 1212 high and the output of inverter 1213 low. Thus, PMAR register 1202 accepts information from PMAR gate 1201. Since the JL lead to inverter 1209 is now high, the PMAR gate accepts information over the A inputs of PM gates 1203, 1204, and 1205, which inputs are associated with leads AC0 through AC8 of destination bus 2020. Accordingly, the binary bits provided from the external memory in a previous step, which bits had been communicated to accumulator 2001, are now utilized as the address location of the next microinstruction to be utilized from program memory 1301. Since it has been assumed that the bits communicated from the external memory are associated with the subtract instruction, the program memory 1301 is directed to step 40. Accordingly, the processor is directed to perform the subtract function by the external memory, but the actual control of the subtract routine, as well as all other routines, remains exclusively under control of the program memory.

CONCLUSION

The versatility of our processor for performing various operations should now be apparent. When it is desired to change programs, all that need be done is write a new set of microinstructions into the program memory in any order and at any place therein. Since the OP code portion of each instruction is decoded dynamically by another memory, and not by an arrangement of gates, no wiring changes need be done to utilize the new program.

Also, it should be apparent that the translator memory need not be arranged as shown and indeed may be arranged to handle many additional functions, either by increasing the word size or by increasing the total number of words. Of course, in the latter case it would also be necessary to expand the OP code portion of each microinstruction to the number of bits necessary to address all of the words of the translator memory.

Because of the basic simplicity of our processor arrangement, it is contemplated that those skilled in the art may find it to their advantage to utilize our techniques in processor applications bearing little or no resemblance to the system described herein, such as, by way of example, an arrangement wherein the translator memory is variable and a particualr OP code may effectively control more than one operation, depending upon the particular word in the memory at the time the OP code is active; or where more than one translator memory is utilized, each having identical address locations therein and where the controlling translator memory is specified by some other program routine.

It should be noted that because of the bus and memory structure of the processor the scratch pad memory can be used as a local memory to store, either permanently or writably from some other source (such as the external memory) instructions for the actual control of the processor. Such use of the local memory could be combined with an execute accumulator instruction (all 1s in the predecoder) to cause the information stored in the accumulator to be transferred to some other location; or to be used as an address within the program memory; or to be used to control the manipulation of data via one of the data manipulation elements.

What is claimed is:

1. A data processor comprising
- a source bus and a destination bus,
- a unique path from said source bus to said destination bus, said unique path including a plurality of data manipulation elements,
- a plurality of paths from said destination bus to said source bus,
- a read only translator memory,
- a program memory containing a series of microinstructions including OP fields for addressing said translator memory,
- a local memory,
- means for accessing said program memory from said destination bus,
- means for accessing said local memory from said destination bus and means for connecting the outputs of said local memory to said source bus,
- a multiphase clock source,
- means responsive to distinct phases of said multiphase clock source for connecting the outputs of an addressed translator memory location in an unpacked manner to individual ones of said data manipulation elements, and
- means responsive to said translator memory outputs and other fields of one of said program memory microinstructions for controlling transfer of information to said source bus and from said destination bus.

2. A data processor in accordance with claim 1 wherein one of said paths from said destination bus to said source bus includes an external memory access register and another of said paths from said destination bus to said source bus includes an external memory buffer register whereby additional processing instructions may be obtained from an external memory and applied through the source bus, the unique path, and the destination bus to said program memory to control the processor.

3. A data processor in accordance with claim 1 wherein said unique path includes an accumulator and further comprising means for transferring microinstructions from said program memory to said source bus, whereby a given one of said microinstructions may be placed in said local memory and then transferred from said local memory to said accumulator,
- an instruction register,
- means for transferring said given one of said microinstructions from said accumulator to said instruction register, and
- predecoder means responsive to an OP code from said program memory for enabling said transferring means.

4. In a processor having a number of elements for controlling data manipulation, each element operable in response to signals communicated thereto,
- a microinstruction store,
- means for obtaining from said microinstruction store a coded microinstruction representative of a processor operation to be performed, each said microinstruction including an operational code field,
- a translator memory having a pluarlity of words, each word individually addressable and each word having a plurality of individual bits,
- means for communicating said operational code field of an obtained coded microinstruction to said translator memory,
- means for addressing said translator memory at an address location therein corresponding directly to said communicated operational code field of said microinstruction so as to obtain said translator memory word contained at said addressed location, and
- means for communicating each said bit of said obtained translator memory word in an unpacked manner to individual ones of said data manipulation elements.

5. The invention set forth in claim 4 wherein said data manipulation elements include
- a plurality of source registers, and
- at least one source multiplexer circuit operable in response to receipt of a coded instruction for selectively enabling data transferal from one of said source registers;
- means for obtaining a first coded instruction representative of a source register from which data is to be transferred, and
- means controlled by a first translator memory bit obtained from said translator memory for communicating said source register coded instruction to said multiplexer circuit.

6. The invention set forth in claim 5 further comprising means for generating a second coded instruction representative of a source register from which data is to be transferred, and means controlled by the inverse of said first translator memory bit for exclusively communicating said source register second coded instruction to said multiplexer circuit.

7. The invention set forth in claim 5 wherein said data manipulation elements include a plurality of destination registers, means operable in response to receipt of a coded instruction for selectively enabling data transferal from one of said destination registers;

means for obtaining a coded instruction representative of a destination register from which data is to be transferred, and means controlled by a second translator memory bit obtained from said translator memory for communicating said destination register coded instruction to said data transferal means.

8. The invention set forth in claim 7 wherein said data manipulation elements further include a rotate control circuit operable in response to a coded instruction for shifting information provided thereto on a number of inputs a certain number of positions with respect to those inputs, the number of positions in which information is shifted being controlled by a received coded instruction, means for obtaining a rotate control coded instruction, and means controlled by a signal converted from a third memory bit obtained from said translator memory for communicating said rotate control coded instruction to said rotate control circuit.

9. The invention set forth in claim 8 wherein said microinstruction store contains a series of microinstructions, each microinstruction containing a plurality of bits and wherein said processor operation coded instruction, said first source register coded instruction, said destination coded instruction and said rotate control coded instruction are all obtained from an operative one of said microinstructions, and further comprising means for communicating a first address location to said microinstruction store to obtain said operative microinstruction stored therein at said communicated address location, and means controlled by certain of said bits obtained from said translator memory at a location controlled by said processor operation coded instruction of said operative microinstruction for exclusively utilizing said first source, said destination and said rotate control coded instructions of said operative microinstruction to form an address location in said microinstruction store associated with a next operative microinstruction.

10. The invention set forth in claim 9 further comprising means controlled by certain of said bits obtained from said translator memory at a location controlled by said processor operation coded instruction of said operative microinstruction for causing said microinstruction store to advance to a location therein sequentially next to said operative microinstruction location to provide a next operative microinstruction.

11. The invention set forth in claim 4 further comprising means for selectively changing any of said microinstructions, said changing means including a further memory having individual words stored therein, which words are communicated to said processor operation coded instruction obtaining means under control of operative ones of said microinstructions.

12. The invention set forth in claim 11 wherein said data manipulation elements include a scratch pad memory operative for storing and for returning stored data, and means controlled by operative ones of said microinstructions for enabling storage or retrieval of data at particular locations within said scratch pad memory.

13. A microinstruction controllable processor arrangement comprising source and destination buses for communicating $n$ information bits in parallel, where $n$ is any positive number, a plurality of registers and at least one memory unit connected between said buses, each said register and each word of said memory unit having $n$ bit capacity and addressable in terms of a coded instruction for transferring information to said source bus and for storing information transferred from said destination bus;

at least one unit connected between said buses and operable for performing logical operations on information bits transferred thereto, and said words being arranged in said memory unit in sequential fashion and defining microinstructions, each including certain bits designated as OP code bits, and means for translating said OP code bits of each said microinstruction into control signals for controlling information transfer to and from said buses and for controlling the performance of logical operations on said transferred information, said translating means including a second memory having a plurality of words each word addressable by said OP code bits, the individual bits of said second memory word utilized in an unpacked manner for directly defining said control signals.

14. The invention set forth in claim 13 further comprising means for obtaining a first coded instruction from each said microinstruction, source connecting means operable in response to receipt of a coded instruction for selectively connecting the register associated with said received coded instruction to said source bus, and means controlled by a unique bit of a word addressed in said second memory for extending said obtained first coded instruction to said source connecting means.

15. The invention set forth in claim 14 further comprising means for obtaining a second coded instruction from each said microinstruction, destination connecting means operable in response to receipt of a coded instruction for connecting said destination bus to a register associated with said received coded instruction, and means controlled by a unique bit of a word addressed in said second memory for extending said obtained second coded instruction to said destination means.

16. The invention set forth in claim 15 further comprising means for obtaining a third coded instruction from each said microinstruction, rotate control means operable in response to a coded instruction for shifting information provided thereto on a number of inputs a certain number of positions with respect to those inputs, the number of positions in which information is shifted being controlled by a received coded instruction, and means controlled by a unique bit of a word addressed in said second memory for extending said third coded instruction to said rotate control means.

17. The invention set forth in claim 13 further comprising means for obtaining a first coded instruction from each said microinstruction, means operable for enabling a plurality of functions, each said function being enabled in response to receipt by said function enabling means of a coded instruction uniquely associated with said function to be enabled, means controlled by a unique bit of a word addressed in said second memory for extending said obtained coded instruction to said function enabling means, means for generating a second coded instruction, and means controlled by said unique bit of said addressed memory word for inhibiting said extension of said first coded instruction to said function enabling means and for extending said second coded instruction in lieu thereof to said function enabling means.

18. The invention set forth in claim 13 further comprising means for obtaining a coded instruction from each said microinstruction, a plurality of means each operable for enabling a plurality of functions, each function enabled in response to receipt by said respective function enabling means of a coded instruction uniquely associated with said function to be enabled, and means controlled by one or more bits of a word addressed in said second memory for extending said obtained coded instruction to selected ones of said function enabling means.

19. A microinstruction controllable processor comprising a program memory containing a series of microprograms, each microprogram containing a set of microinstructions, means for addressing said program memory to provide an operative microprogram, means controlled by said operative microprogram for sequentially providing operative microinstructions from the set of microinstructions associated with said addressed microprogram, means for writing microprograms into said program memory of selected address locations therein, and means controlled by a processor control field of said provided operative microinstruction for providing signals to control the processor, said program memory addressing means including a second memory separate from said program memory, the individual words of which are selected by said program memory and communicated to said program memory addressing means under control of a provided operative microinstruction, and means controlled by said operative microinstruction for enabling said program memory write means so as to selectively change certain ones of said microprograms.

20. The invention set forth in claim 19 wherein each said word obtained from said second memory contains a plurality of fields, each field containing information utilized by said program memory addressing means for defining within said program memory an address location corresponding to a particular microprogram and for defining a microprogram to be written thereat.

21. The invention set forth in claim 20 wherein each said field of an obtained other memory word from said second memory communicated individually to said program memory addressing means under control of different operative ones of said microinstructions.

* * * * *

UNITED STATES PATENT OFFICE
CERTIFICATE OF CORRECTION

Patent No. 3,748,649 Dated July 24, 1973

Inventor(s) James Royce McEowen, David Clement Opferman and Robert McKee Smith

It is certified that error appears in the above-identified patent and that said Letters Patent are hereby corrected as shown below:

Column 5, line 25, after "the" (second occurrence) delete "and" and substitute therefor --years--;

line 37, change "ad" to --and--.

Column 7, line 38, change "112" to --1102--.

Column 9, line 58, change "instrcution" to --instruction--.

Column 20, line 23, change "step-8" to --step 8--.

Column 21, line 17, change "over-" to --over--.

Column 24, line 36, change "pluarlity" to --plurality--.

Column 28, line 40, after "memory" and before "communicated" insert --is--.

Signed and sealed this 8th day of January 1974.

(SEAL)
Attest:

EDWARD M.FLETCHER,JR.
Attesting Officer

RENE D. TEGTMEYER
Acting Commissioner of Patents